United States Patent
Smith

(10) Patent No.: US 11,718,046 B2
(45) Date of Patent: Aug. 8, 2023

(54) IN-LINE AUTOCLAVE ADAPTED TO PREFORM GEOMETRY

(71) Applicant: The Boeing Company, Chicago, IL (US)

(72) Inventor: Daniel R. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,254

(22) Filed: Nov. 10, 2021

(65) Prior Publication Data

US 2022/0152945 A1    May 19, 2022

Related U.S. Application Data

(60) Provisional application No. 63/115,032, filed on Nov. 18, 2020.

(51) Int. Cl.
| | | |
|---|---|---|
| *B29C 70/34* | (2006.01) | |
| *B29C 70/54* | (2006.01) | |
| *B29C 70/68* | (2006.01) | |
| *B29L 31/30* | (2006.01) | |

(52) U.S. Cl.
CPC .......... *B29C 70/342* (2013.01); *B29C 70/544* (2021.05); *B29C 70/549* (2021.05); *B29C 70/681* (2013.01); *B29L 2031/3082* (2013.01); *B29L 2031/3085* (2013.01)

(58) Field of Classification Search
CPC ... B29C 70/342; B29C 70/544; B29C 70/549; B29C 70/681; B29C 35/0227; B29C 70/44; B29C 35/045; B29L 2031/3082; B29L 2031/3085; Y02T 50/40
See application file for complete search history.

(56) References Cited

U.S. PATENT DOCUMENTS

| | | | | |
|---|---|---|---|---|
| 4,997,511 | A | * | 3/1991 | Newsom .................. B01J 3/006 |
| | | | | 425/389 |
| 5,468,140 | A | * | 11/1995 | Hoffman ................. B29C 43/12 |
| | | | | 425/389 |
| 5,693,175 | A | * | 12/1997 | Jarrett .................... B27D 1/086 |
| | | | | 156/499 |
| 9,277,594 | B2 | | 3/2016 | Matsen et al. |
| 10,391,684 | B1 | * | 8/2019 | Margraf, Jr. .......... B29C 43/003 |
| 2010/0024964 | A1 | | 2/2010 | Ingram, Jr. et al. |

(Continued)

FOREIGN PATENT DOCUMENTS

| | | |
|---|---|---|
| DE | 102017107908 A1 | 10/2018 |
| WO | 2021032430 A1 | 2/2021 |

OTHER PUBLICATIONS

Netherlands Patent Office Written Opinion and Search Report with English Translation, dated Jul. 28, 2021, regarding Application No. NL2028117, 10 pages.

(Continued)

*Primary Examiner* — Jun S Yoo
(74) *Attorney, Agent, or Firm* — Yee & Associates, P.C.

(57) ABSTRACT

A method for hardening a preform into a composite part is provided. The method comprises aligning a layup mandrel carrying a preform for insertion into an autoclave having an inner surface that is complementary to a contour of the preform. The layup mandrel is then sealed into the autoclave.

20 Claims, 18 Drawing Sheets

(56) References Cited

U.S. PATENT DOCUMENTS

2016/0236454 A1* 8/2016 Potts .................... B29C 70/543
2020/0094490 A1* 3/2020 Shewchuk ............ B29C 70/342

OTHER PUBLICATIONS

Netherlands Patent Office Written Opinion and Search Report with English Translation, dated Jul. 28, 2021, regarding Application No. NL2028115, 9 pages.
Netherlands Patent Office Written Opinion and Search Report with English Translation, dated Jul. 28, 2021, regarding Application No. NL2028114, 9 pages.
Netherlands Patent Office Written Opinion and Search Report with English Translation, dated Jul. 12, 2021, regarding Application No. NL2028112, 10 pages.
Netherlands Patent Office Written Opinion and Search Report with English Translation, dated Sep. 1, 2021, regarding Application No. NL2028113, 7 pages.
"Front Loading Pass-Through Autoclaves," Mar. 31, 2014, Priorclave Limited, London, United Kingdom, 1 page. (XP55826176) https://www.priorclave.com/en/wp-content/uploads/sites/4/2018/09/Pass-Through-Datasheet.pdf.
European Patent Office Extended Search Report, dated Mar. 23, 2022, regarding Application No. EP21207374.6, 6 pages.
European Patent Office Extended Search Report, dated Mar. 28, 2022, regarding Application No. EP21207378.7, 5 pages.
European Patent Office Extended Search Report, dated Mar. 29, 2022, regarding Application No. EP21207377.9, 6 pages.

* cited by examiner

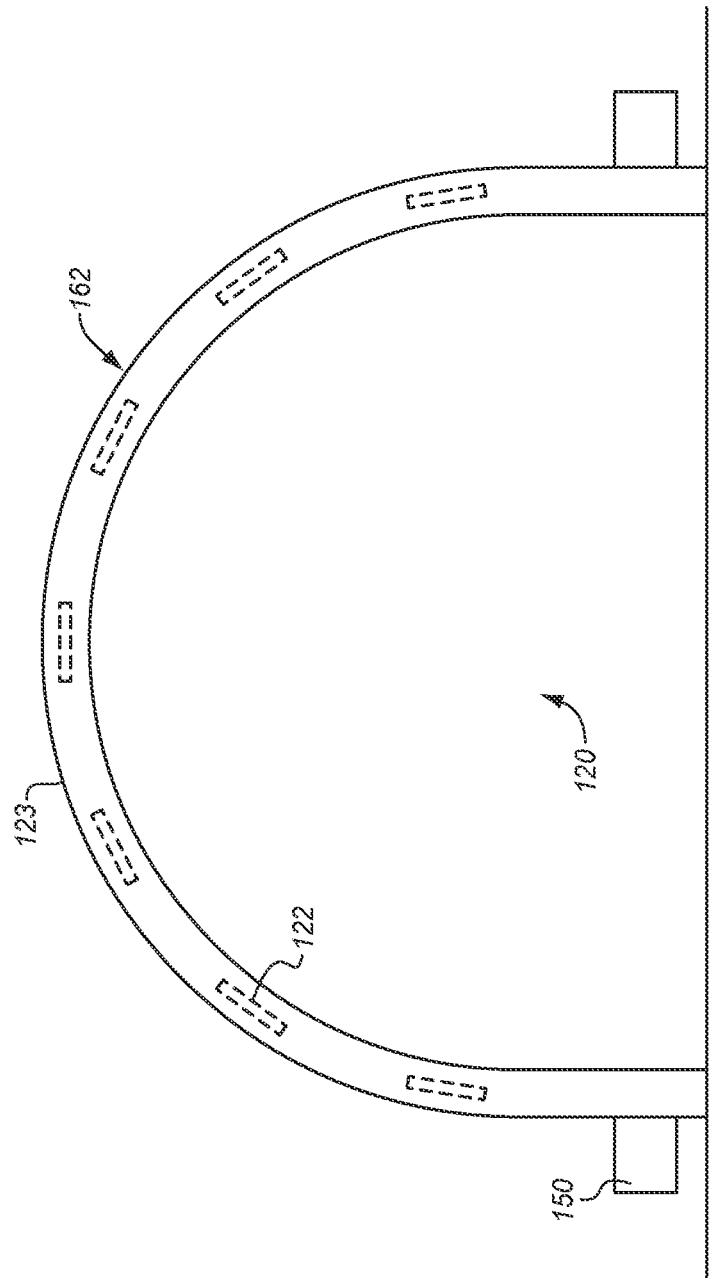

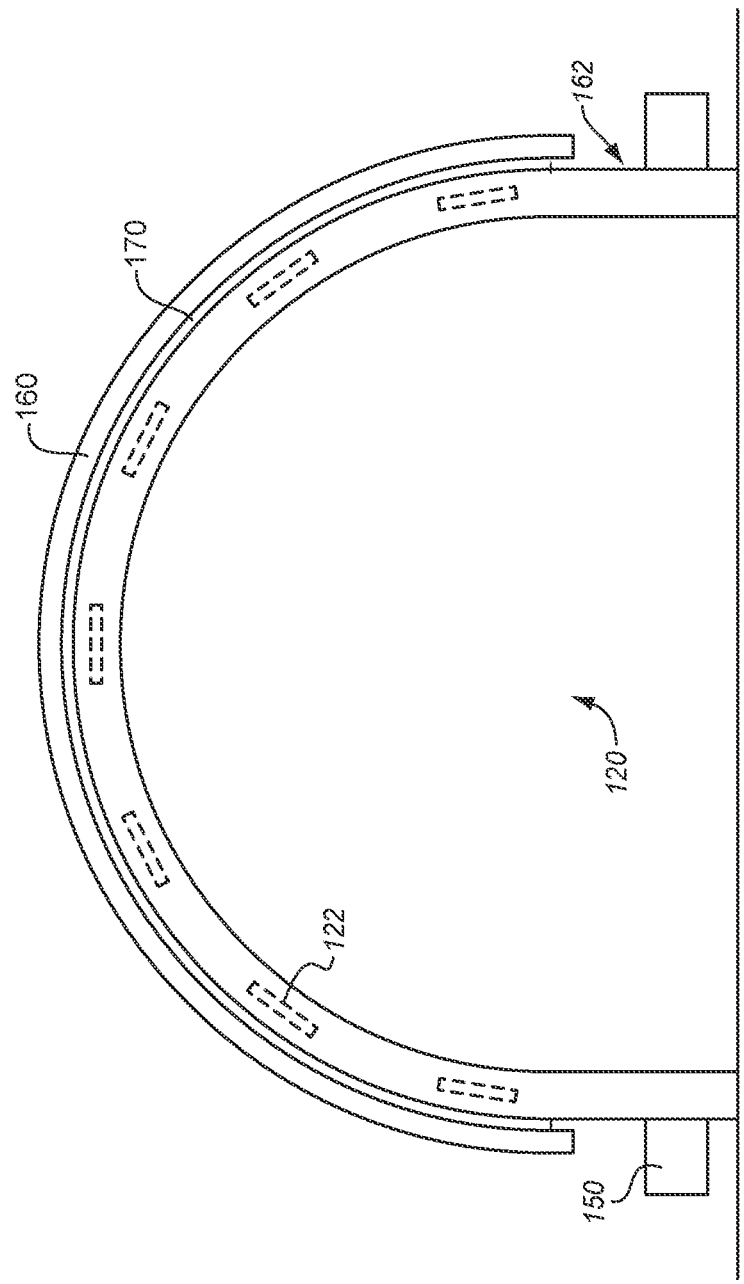

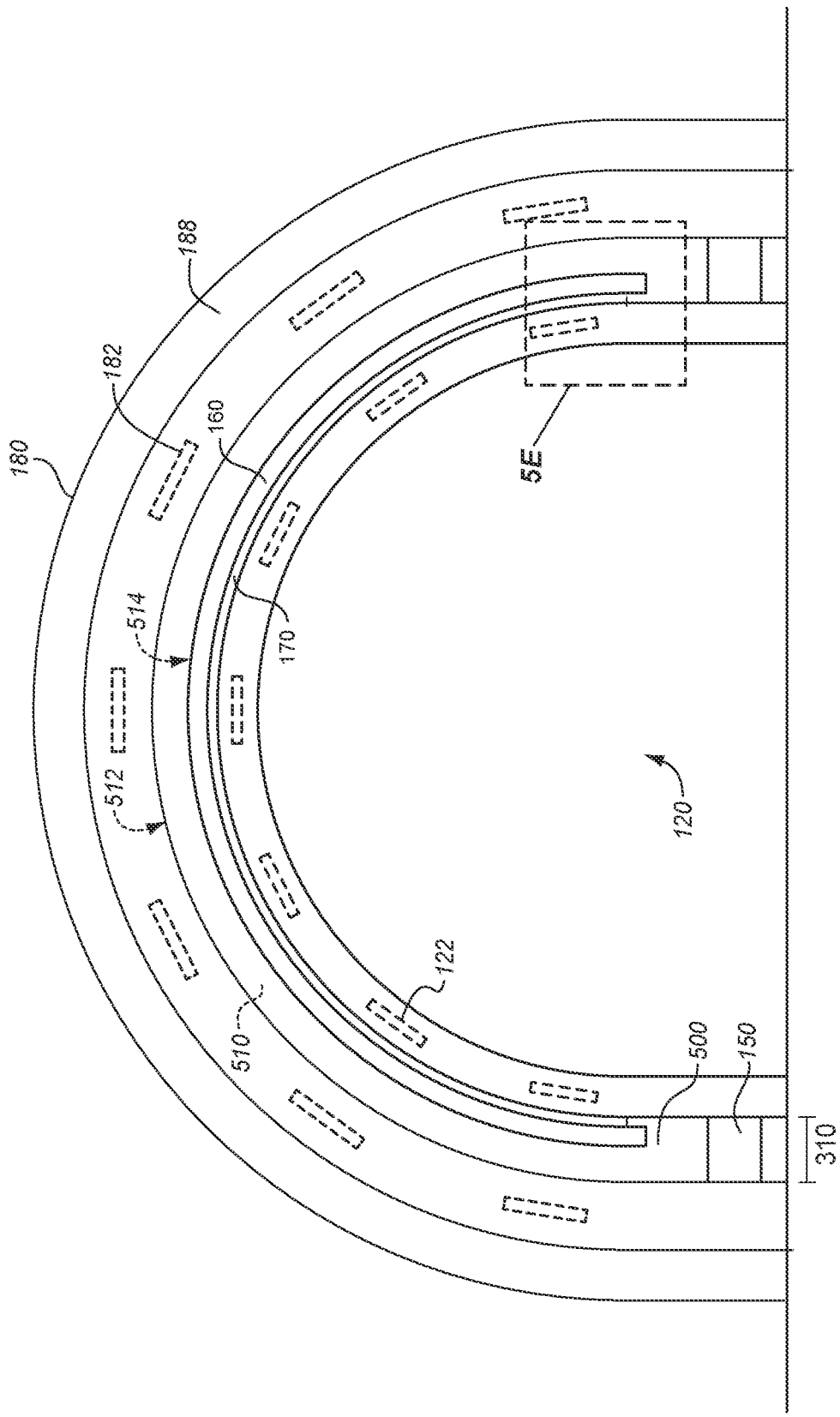

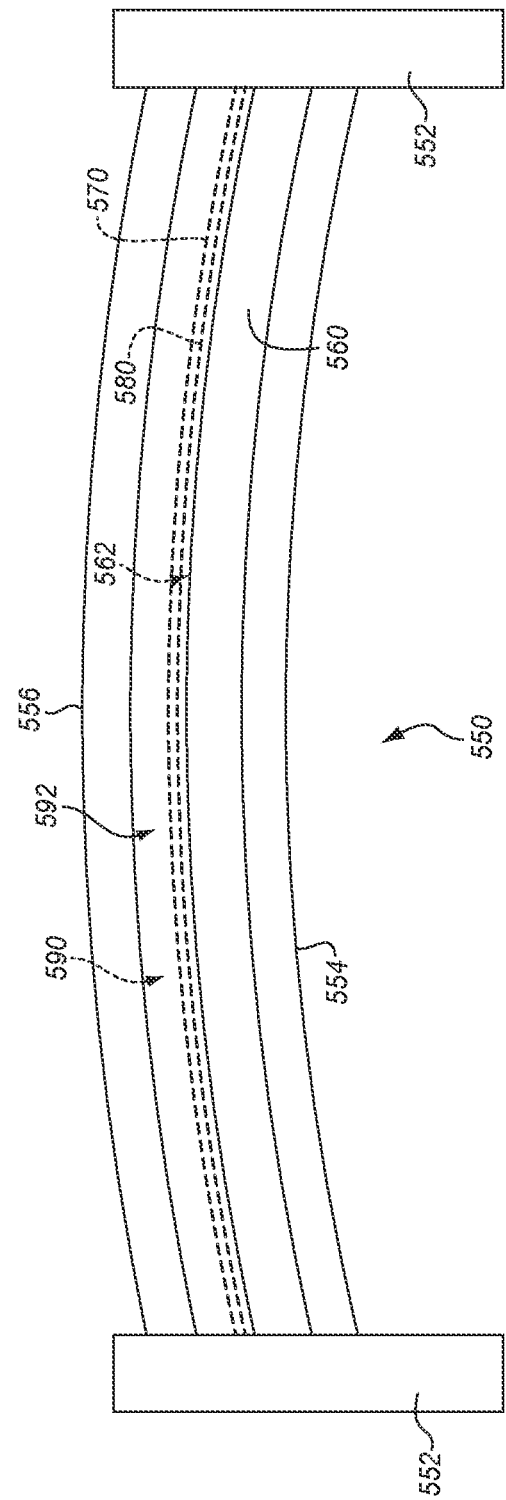

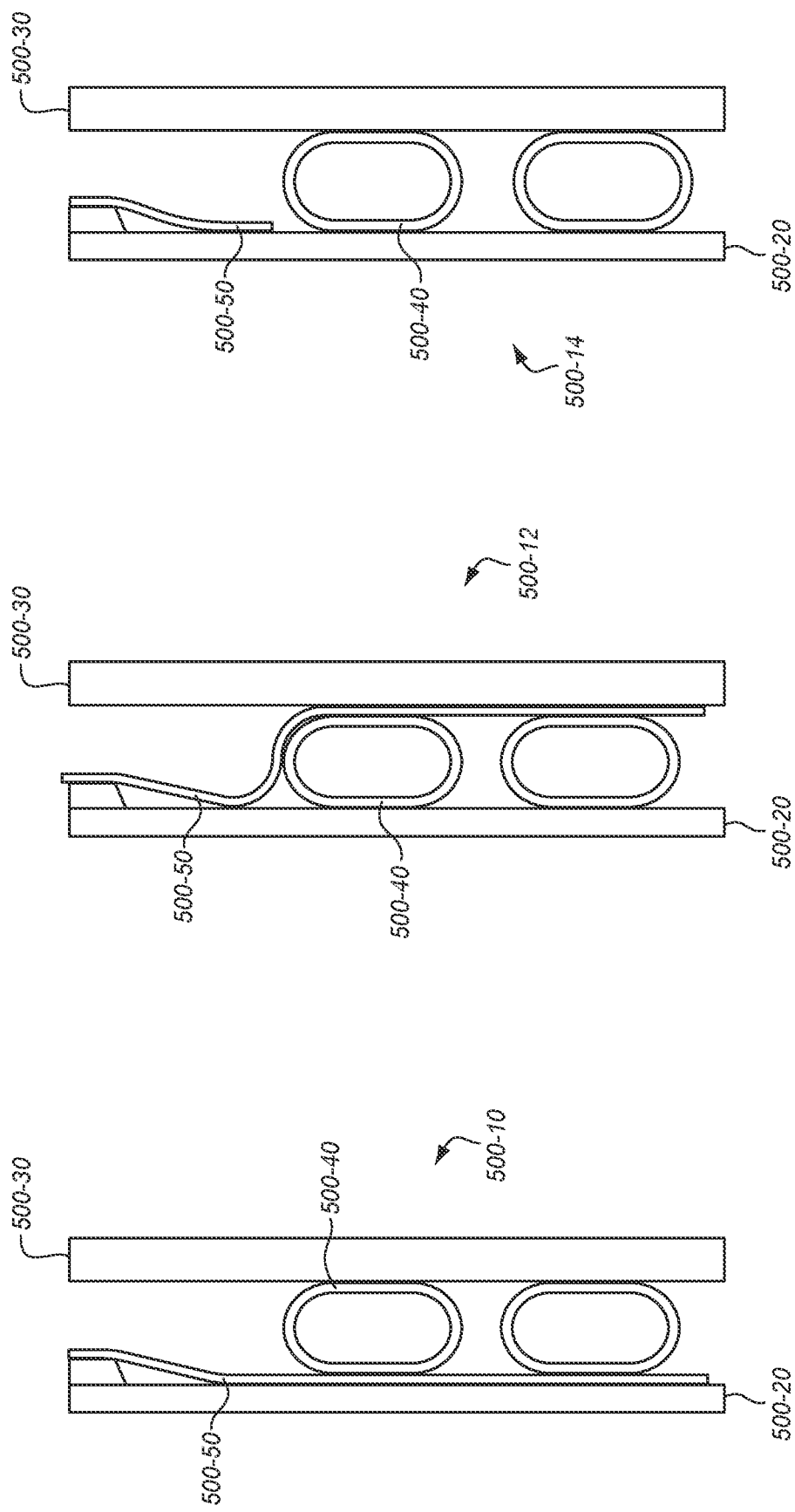

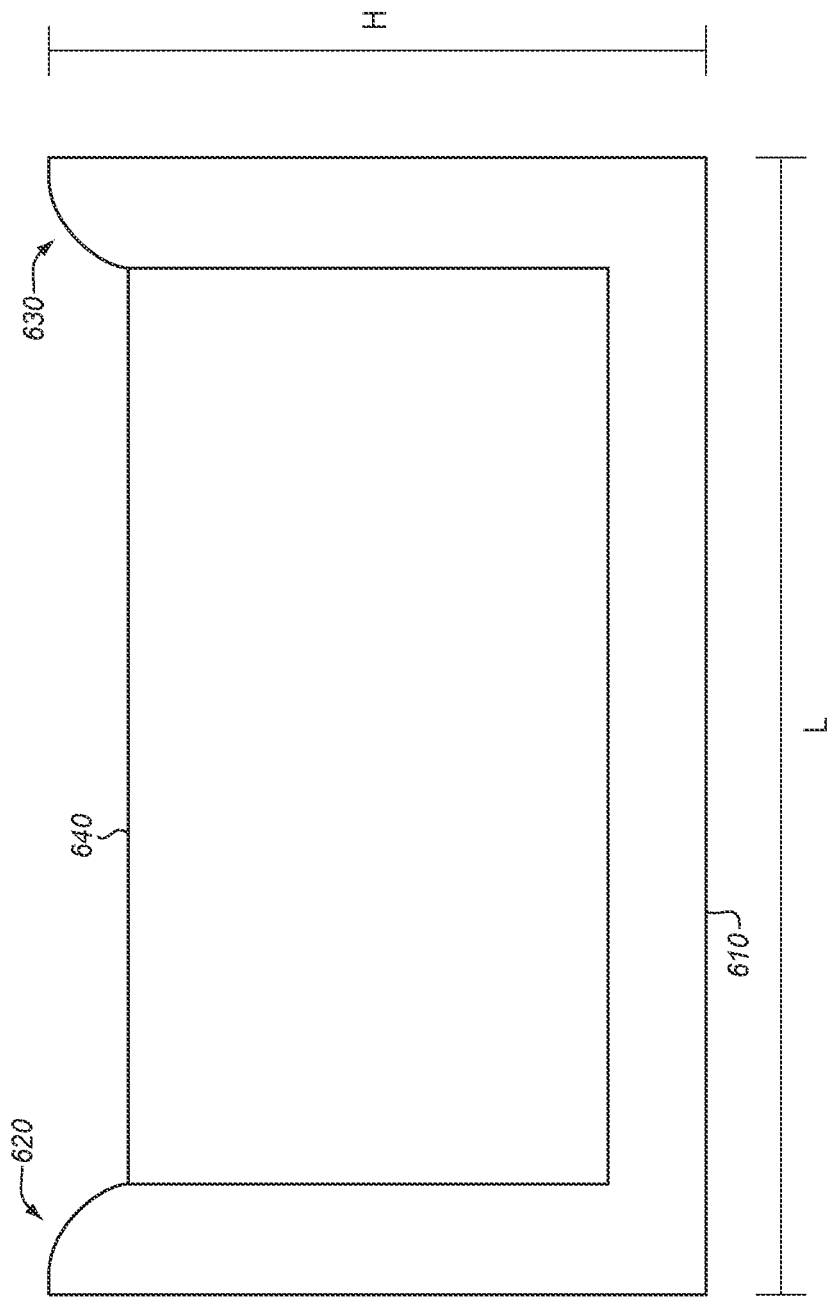

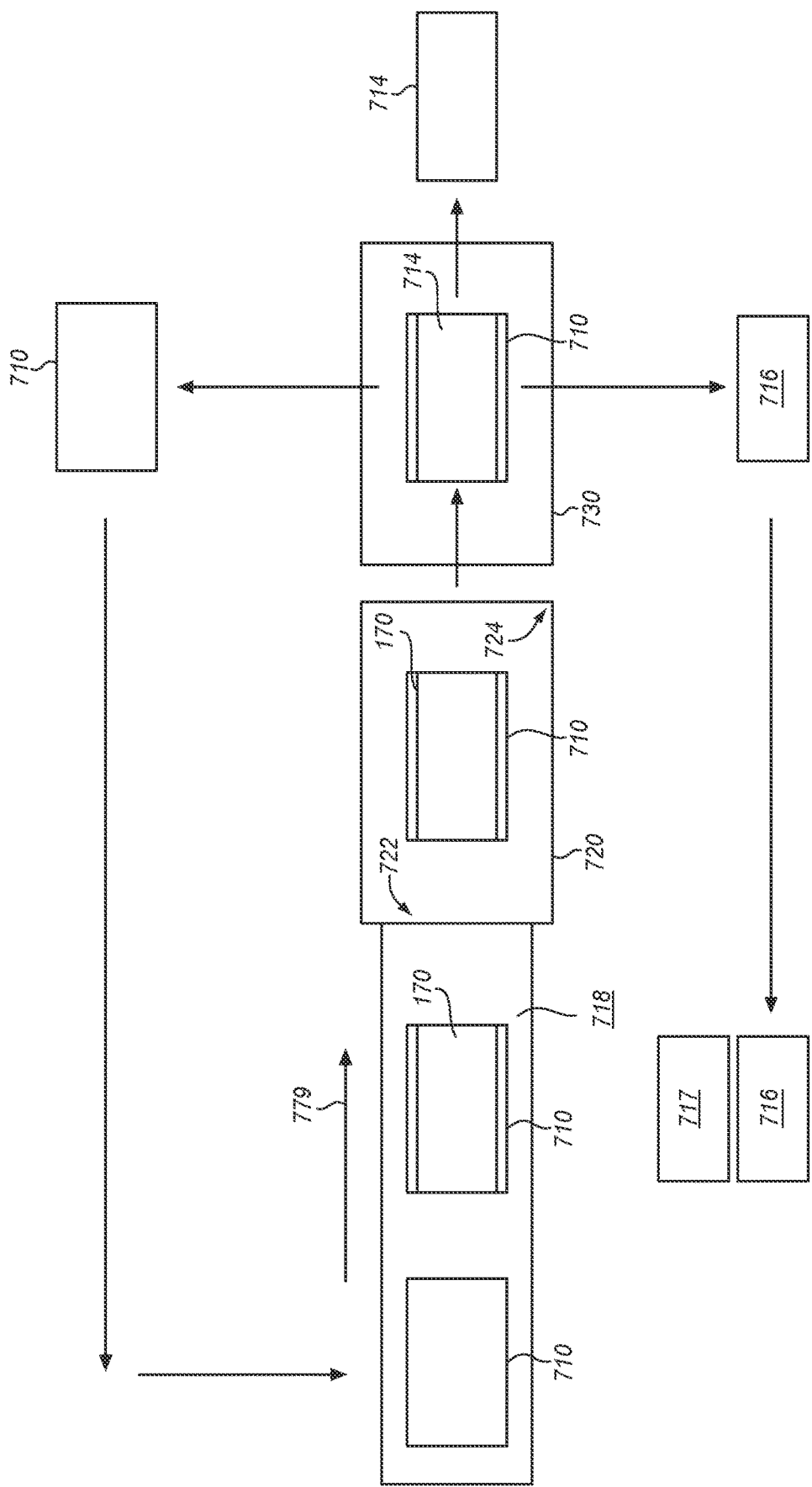

IN-LINE AUTOCLAVE ADAPTED TO PREFORM GEOMETRY

CROSS-REFERENCE TO RELATED APPLICATION

This application claims the benefit of U.S. Provisional Patent Application Ser. No. 63/115,032, filed Nov. 18, 2020, and entitled "In-Line Autoclave Adapted To Preform Geometry;" which is incorporated herein by reference in its entirety.

FIELD

The disclosure relates to the field of processing of airframe or other high-performance components, and in particular, to autoclave processing of such components.

BACKGROUND

For fabrication of airframe or other high performance components made from composite materials, such as Carbon Fiber Reinforced Polymer (CFRP), autoclaves are utilized to harden uncured preforms into final part. Autoclaves are designed for processing composite components at elevated temperatures and/or pressures and are heated by pumping heated gas into the autoclave at pressure. In a traditional factory environment, the autoclave itself may be designed to accommodate a wide range of component geometries or a plurality of components during the same processing cycle. This can result in large scale autoclaves which require a significant initial equipment investment, with substantial foundation, installation and auxiliary equipment costs.

For large scale autoclaves, their large thermal mass and large volume for receiving a variety of component geometries require significant use of energy and gas, impacting utility costs for their operation. Significant time and energy are required to heat and pump the heated gas into the autoclave, and additional heated gas must be pumped in and maintained or replenished until the autoclave and its contents have reached a desired processing temperature and process time, further increasing operation costs.

Large scale autoclaves may also hinder efficient assembly line flow within a factory environment, given their installation on a dedicated foundation and the use of gas storage tanks, such as for inert nitrogen, which need to position on an external wall. Further, the large scale cost and operating costs of the autoclaves makes its use at the end of all pre-hardening fabrication processing in a centralized location, the norm. Transportation of components to and from the autoclave may not allow for optimized processing of components in a continuous or moving line manufacturing configuration. And the inherent time required for the heating, pressurizing, and cooling of such autoclaves further prohibits efficient processing time and factory operation.

Therefore, it would be desirable to have a method and apparatus that take into account at least some of the issues discussed above, as well as other possible issues.

SUMMARY

Embodiments described herein provide autoclaves which receive preforms that have been laid-up in part of a continuous line fabrication process. The autoclaves are dimensioned to receive specific types of preforms, and include inner surfaces that correspond with contours defined by the preforms. One technical benefit is this reduces the amount of volume and mass that is heated within the autoclave, which reduces cycle time and increases efficiency. Furthermore, the autoclaves described herein may enable a hardened composite part to exit by continuing in the same direction that the autoclave was entered. This saves space on the factory floor, reducing expense.

Other illustrative embodiments (e.g., methods and computer-readable media relating to the foregoing embodiments) may be described below. The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Some embodiments of the present disclosure are now described, by way of example only, and with reference to the accompanying drawings. The same reference number represents the same element or the same type of element on all drawings.

FIGS. 5A-5C are views of the autoclave of FIG. 4 in an illustrative embodiment.

FIG. 5D is a view of a further layup mandrel and autoclave for a wing panel in an illustrative embodiment.

FIG. 5E depicts a variety of sealing regimes for an autoclave in an illustrative embodiment.

FIG. 6 is side view of a layup mandrel that includes extended regions for sealing to an autoclave in an illustrative embodiment.

FIG. 7 is a top view of an autoclave and preparation station in an illustrative embodiment.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Airframes may be implemented as composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. Alternatively, the preform may also include woven fiber fabric or materials with random or discontinuous fibers. The preform may include a viscous resin that solidifies in order to harden the preform into a composite part. Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
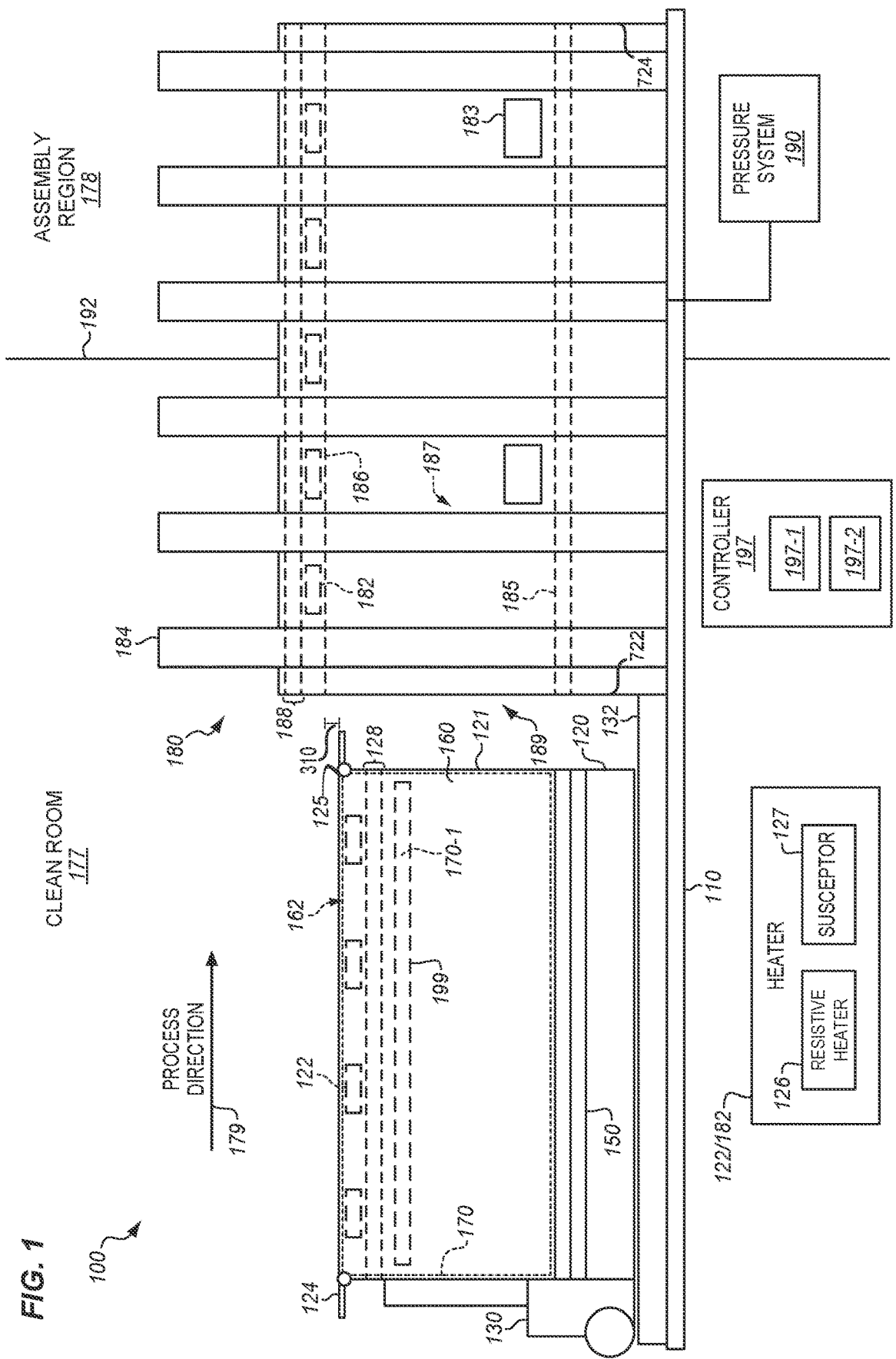
FIG. 1 is a block diagram of a line assembly system that includes an autoclave for hardening preforms into composite parts in an illustrative embodiment.

FIG. 1 is a block diagram of a line assembly system 100 that includes an autoclave 180 for hardening preforms (i.e., curing thermoset preforms, re-heating and consolidating thermoplastic preforms) into composite parts in an illustrative embodiment. Line assembly system 100 comprises any system, device, or component operable to iteratively pulse a preform 170 for a half barrel section of fuselage (or other arcuate section of fuselage comprising skin and stringers) in a process direction 179. In this embodiment, line assembly system 100 includes an autoclave 180 which hardens the preform 170 via the application of heat and pressure.

The preform 170 is laid-up onto a layup mandrel 120 that proceeds in a process direction 179 along a factory floor 110, and is driven by an Autonomous Guided Vehicle (AGV) 130 or along a track 132 that leads to the autoclave 180. The layup mandrel 120 includes a perimeter 121. A caul plate 160 (or a vacuum bag) is placed over the preform 170, and follows a contour 162 of the preform 170. A layup surface 123 (see FIG. 5A) of the layup mandrel 120 defines the contour 162 of the preform 170. The caul plate 160 seals the preform 170 to the layup mandrel 120 prior to sealing the layup mandrel 120 to an inner surface 186 of the autoclave 180. In this embodiment, the caul plate 160 is sealed via vacuum to the layup mandrel 120 (e.g., via a vacuum system internal to the layup mandrel 120), which results in application of consolidation force to the preform 170. In further embodiments, a vacuum bag (e.g., vacuum bag 717 in FIG. 7) is utilized to perform this task.

During operation, the layup mandrel 120 is driven into a hollow portion (e.g., passageway 189) of the autoclave 180 via entrance 722. While the layup mandrel 120 is inserted into the autoclave 180, the layup mandrel 120 and the autoclave 180, along with perimeter seals 150 and caul plate 160, define a pressure chamber 187 (referred to herein as a vacuum, pressure, pressurized, or sealed chamber) for the preform 170. Perimeter seals 150 at the layup mandrel 120 seal against an inner surface 186 of the autoclave 180, which causes the autoclave 180 and the layup mandrel 120 together to form pressure chamber 187 in which the preform 170 is heated. That is, the perimeter seals 150 seal a perimeter 121 of the layup mandrel 120 to the inner surface 186 of the autoclave 180. In this embodiment, the layup mandrel 120 also includes gap seals 124, which may comprise rigid or other thermal barriers for sealing gap 310 (e.g., an arcuate gap) by clamping to the autoclave 180 to form a pressure chamber 187 (i.e., any sealed/sealable chamber capable of supporting a different-than-atmospheric amount of pressure). The gap seals 124 are mounted via hinges 125 to the layup mandrel 120. The gap seals 124 may form an arcuate shape and may comprise rigid segments of material. Although hinge-mounted gap seals 124 are discussed, they are but one embodiment of sealing in an autoclave 180, and other types of seals may be utilized to engage layup mandrel 120, caul plate 160, and autoclave 180 in order to form the pressure chamber 187.

Because the inner surface 186 of the autoclave 180 follows the contour 162 of the preform 170, it is complementary to the contour 162 and is separated by only a small distance (e.g. gap 310) from the contour 162 (e.g., less than ten inches, such as less than two inches). This means that heat and pressure applied to the pressure chamber 187 is applied to a smaller volume than in traditional autoclaves, which increases heating efficiency and hardening speed. This also means that the autoclave 180 has less thermal mass, and that smaller pieces of equipment may be used to pressurize the autoclave 180 (e.g., with nitrogen gas or other inert fluids).

Heaters 182 are disposed within the autoclave 180 under an insulated shroud 188. In this embodiment, the insulated shroud 188 includes vanes 184 which provide structural reinforcement to the autoclave 180 and facilitate the dissipation of heat after the autoclave 180 has completed a heating cycle. Heaters 182 at the autoclave 180 and heaters 122 at the layup mandrel 120 may comprise radiant heaters that increase a temperature of the chamber. In one embodiment, heaters 122/182 are zonally controlled to ensure that temperature remains within an expected range uniformly across the entire surface of the preform 170. By continually monitoring and adjusting the amount of heat applied by the heaters 122/182 on a zone-by-zone basis, a temperature of the preform 170 is precisely controlled across the entirety of the preform 170.

The heaters 122/182 are insulated from the exterior of the autoclave 180 and from the interior of the layup mandrel 120 by insulated shroud 188 and insulated shroud 128, respectively. The insulated shrouds 128/188 may comprise vacuum sealed or other thermally insulated regions. A pressure system 190 controls a pressure at the pressure chamber 187 during hardening/processing, for example, by drawing a vacuum within the pressure chamber 187 or increasing a pressure of the pressure chamber 187. In this embodiment, vents 183 for driving heated gas into a pressure chamber 187 formed between the layup mandrel 120, the autoclave 180, the perimeter seals 150, and the caul plate 160 are also provided. Including heaters 122/182 at the layup mandrel 120 and the autoclave 180 reduces the distance between the heaters 122/182 and the preform 170, which increases heat transfer efficiency. Using a "right sized" pressure chamber 187 that has little excess volume ensures that less gas (e.g., nitrogen gas or other inert fluid) is used by the line assembly system 100, which reduces material costs and also heat cycling time. The pressure chamber 187 discussed herein thereby reduces thermal mass and complexity of the autoclave structure, which reduces the amount of pressurized gas that needs to be stored.

In some embodiments, bladder 199 is disposed at the preform 170, and structurally supports any suitable hollow interior 170-1 of the preform 170 (e.g., a hollow interior 170-1 of a hat stringer disposed at the preform 170), thereby preventing the hollow interior 170-1 from collapsing during processing. The bladder 199 is therefore disposed underneath a caul plate 160 or vacuum bag that is used to consolidate the preform 170. In this manner, the bladder 199 supports a hollow interior 170-1 of the preform 170 against compaction caused by pressure applied by the autoclave 180.

The bladder 199 communicates with a pressure chamber 187 formed by the autoclave 180, which means that when the pressure chamber 187 is pressurized, the bladder 199 is also pressurized and therefore inflates. In this manner, the bladder 199 is inflated via pressure from the pressure chamber 187.

After heating, the vanes 184 at the autoclave 180 facilitate cooling of the autoclave 180 to a handling temperature at which the layup mandrel 120 and composite part 714 (see FIG. 7) are removed in the process direction 179, and a next layup mandrel 120 can be inserted from upstream. In a further embodiment, two layup mandrels 120 are arranged in series or tandem, and placed into the autoclave 180 at the same time. In such embodiments, each layup mandrel 120 may be sealed to the autoclave 180 to close a different door/entrance (e.g., entrance 722 or exit 724) of the autoclave 180. The next layup mandrel 120 is then inserted into the autoclave 180 and the process is repeated. This unique technical arrangement, which enables a layup mandrel 120 to define part of the boundary of a pressure chamber 187 of the autoclave 180, saves both energy and time. Furthermore, because the autoclave 180 has less thermal mass than traditional autoclaves, it may be rapidly heated and cooled, which reduces cycle time and increases throughput.

In this embodiment, the autoclave 180 itself forms part of a boundary or gated passageway 189 between a clean room environment 177 and an assembly region/environment 178 (which does not operate as a clean room environment). For example, the autoclave 180 may be placed through a boundary 192, such as a shroud or wall that prevents dust from entering the clean room environment 177, with entrance 722 in the clean room environment 177. Thus, the autoclave 180 forms a portion of a boundary of a clean room environment 177. Upon completion of processing of the preform 170 into a composite part 714, the composite part leaves the autoclave 180 via exit 724 and enters the assembly region/environment 178.

To restate the above, the autoclave 180 includes an inner surface 186 configured to slidably receive a layup mandrel 120, and to form a pressure chamber 187 in combination with the layup mandrel 120 after the layup mandrel 120 has been slidably received, and further defines an arcuate or contoured gap 310 defined by the inner surface 186 that is configured to receive a gap seal 124 that seals the layup mandrel 120 to the inner surface 186. The layup mandrel 120 defines a contour 162 for a preform 170, and includes the perimeter seals 150 that seal the layup mandrel 120 to the autoclave 180 when the layup mandrel 120 is slid into the autoclave 180, and gap seals 124 that seal gap 310 (e.g., an arcuate gap) between the layup mandrel 120 and the autoclave 180 after the layup mandrel 120 is slid into the autoclave 180. In this manner, the arcuate layup mandrel 120 and the arcuate autoclave 180 form complementary arcs.

In one embodiment, preforms 170 are heated in an autoclave 180, which is operated as a dedicated station with a full-length pulse corresponding with the length of a half barrel section of fuselage. Therefore, there may be an assembly line for layup prior to the autoclave 180 and an assembly line after the autoclave 180 with upper and lower half barrel sections on the line in series. When lower half barrel sections are downstream of upper half barrel sections, the lower half barrel sections receive each type of work prior to the corresponding upper half barrel sections. For example, the lower half barrel section may be hardened before the upper half barrel section, receive frames before the upper half barrel section, etc. In one embodiment, the upper half barrel section and lower half barrel section are co-cured in a tandem autoclave, but the lower half barrel section exits the autoclave and enters an assembly line first. In one embodiment, two half barrel sections are processed at the same time by the same autoclave 180. Layup mandrels 120 for the half barrel sections are arranged in tandem and sealed together or independently to the autoclave 180 and processed at the same time.

A controller 197, comprising a processor 197-1 and a non-transitory computer readable medium 197-2, manages the operations of the various components described herein, including for example, heaters 122/182, pressure system 190, autoclave 180, etc., to perform the methods described herein. In one embodiment, controller 197 is implemented as custom circuitry, as a hardware processor executing programmed instructions stored in memory, or some combination thereof.

Further details of the operation of line assembly system 100 will be discussed with regard to FIG. 2. Assume, for this embodiment, that the layup mandrel 120 has received a preform 170, and that the preform 170 has been sealed onto the layup mandrel 120 via the application of caul plate 160. Hence, the preform 170 is ready to be hardened into a composite part 714.

Figure 2:
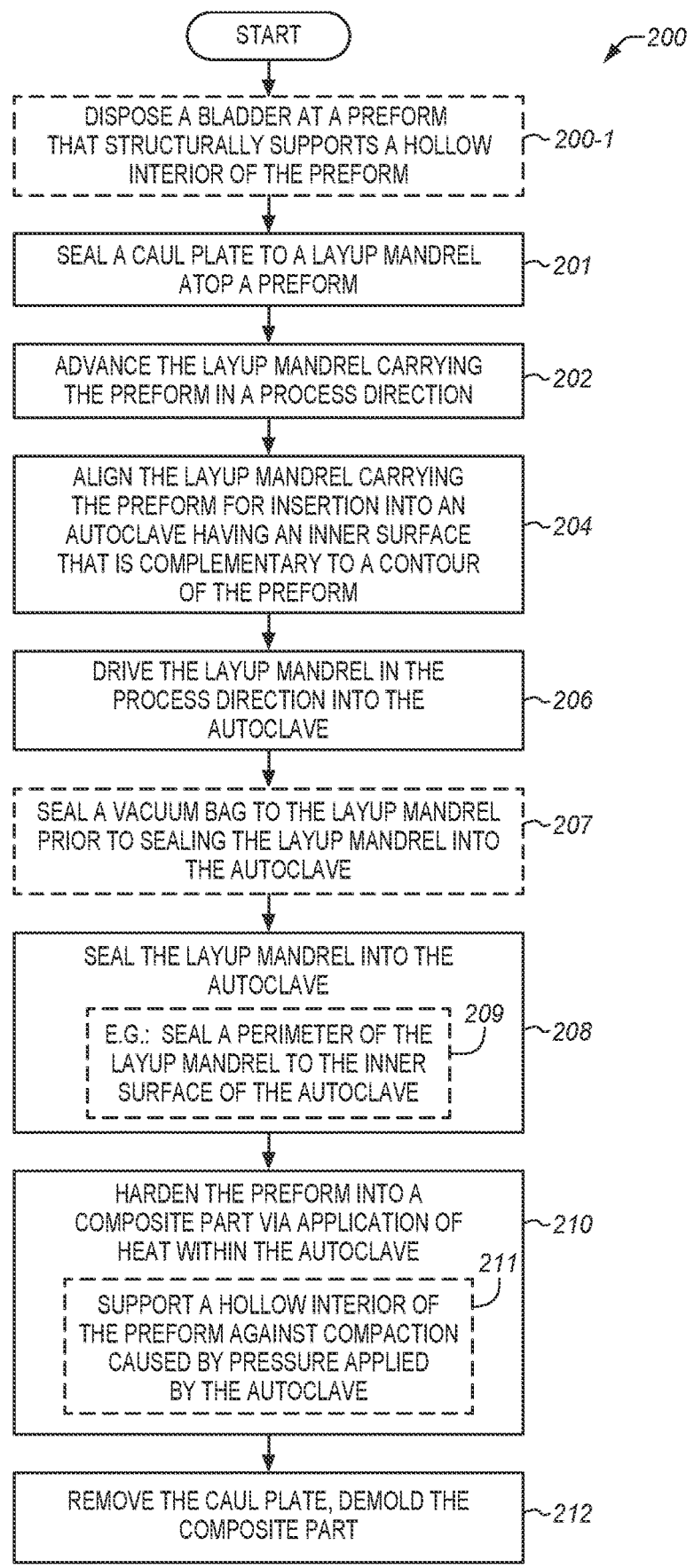
FIG. 2 is a flowchart illustrating a method for operating a line assembly system to harden a preform in an autoclave in an illustrative embodiment.

FIG. 2 is a flowchart illustrating a method for operating a line assembly system to harden a preform in an autoclave in an illustrative embodiment. The steps of method 200 are described with reference to line assembly system 100 of FIG. 1, but those skilled in the art will appreciate that method 200 may be performed in other systems. The steps of the flowcharts described herein are not all inclusive and may include other steps not shown. The steps described herein may also be performed in an alternative order. Furthermore, although the steps herein are described for half barrel sections, they may be applied to any suitable arcuate sections of fuselage, such as full barrel sections, one-quarter barrel sections, or other segment sizes. In further embodiments, the autoclaves are dimensioned to harden any suitable structures, such as wing panels, spars, frames, floor beams, stabilizers, doors, etc. In such cases, the insulated shroud 188 of the autoclave 180 is sized and shaped to be complementary to a contour 162 of a layup mandrel 120 for such components, and perimeter sealing 150 is used to seal the layup mandrel 120 to the autoclave 180. In one embodiment, prior to sealing, one or more bladders 199 are disposed at a preform 170 (optional step 200-1). These bladders 199 structurally support one or more hollow interiors 170-1 of the preform 170.

Step 201 includes sealing a caul plate 160 to a layup mandrel 120 atop a preform 170. This comprises taping, suction-adhering, vacuum sealing, or otherwise securing the caul plate 160 against the preform 170 while preventing airflow from crossing the caul plate 160 to reach the preform 170. Step 202 includes advancing the layup mandrel 120 carrying the preform 170 in a process direction 179. This may comprise driving the layup mandrel 120 via the Autonomous Guided Vehicle (AGV) 130, or advancing the layup mandrel 120 via tracks 132 that couple with the autoclave 180. In one embodiment, the layup mandrel 120 has already advanced in the process direction 179 through multiple layup stations, as well as a preparation station at which the preform 170 is sealed to the layup mandrel 120. This may include sealing a caul plate 160 to the layup mandrel 120 prior to driving the layup mandrel 120 into the autoclave 180. In such embodiments, the caul plate 160 itself operates as a vacuum bag for the preform 170.

Step 204 includes aligning the layup mandrel 120 carrying the preform 170 for insertion into the autoclave 180, which has an inner surface 186 that follows/is complementary to a contour 162 of the preform 170. This may comprise placing the layup mandrel 120 into position such that driving the layup mandrel 120 in the process direction 179 results in insertion of the layup mandrel 120 into the autoclave 180 via entrance 722. Thus, unlike autoclaves which themselves define all walls/boundaries of a pressure chamber, an autoclave 180 of method 200 forms a pressure chamber 187 together with the layup mandrel 120 and any perimeter seals 150, gap seals 124, and/or insulated shrouds 128. The seals and/or shrouds engage the autoclave insulated shroud 188, which can be longitudinally open at the factory floor 110.

In step 206, the Autonomous Guided Vehicle (AGV) 130 (or a tug, or manual cart) drives the layup mandrel 120 in the process direction 179 into the autoclave 180 via entrance 722, thereby nesting the preform 170 to the inner surface 186 of the autoclave 180. This may comprise aligning perimeter seals 150 with a complementary feature 185 (e.g., a groove or projection) in FIG. 1 at the inner surface 186, and mating the perimeter seals 150 with the complementary feature 185 at the inner surface 186 to form an airtight boundary. In further embodiments, an airtight seal is formed without the need for the complementary feature 185, by carefully dimensioning the perimeter seals 150. Because the inner surface 186 follows the contour 162, driving the layup mandrel 120 into the autoclave 180 results in a gap 310 between the inner surface 186 of the autoclave 180 and the contour 162 of the preform 170 of less than ten inches (e.g., less than two inches). The airtight seal may be achieved via compression of a flexible coating or liner at the perimeter seals 150, which occurs when the perimeter seals 150 are driven into the complementary feature 185 of the autoclave 180. In further embodiments, pairs of layup mandrels 120 in series are placed into the autoclave 180. For example, pairs of layup mandrels 120 carrying separate half barrel sections (that will later be joined into a full barrel section after the half barrel sections are hardened and demolded), may both be placed into the autoclave 180 in series, such that one layup mandrel 120 is downstream of the other layup mandrel 120 within the autoclave 180. Sealing a vacuum bag 717 to the layup mandrel 120 may be performed prior to sealing the layup mandrel 120 into the autoclave 180 (optional step 207).

In step 208, the layup mandrel 120 is sealed into the autoclave 180. This may comprise sealing gap 310 between the layup mandrel 120 and the autoclave 180 at either or both ends (e.g. entrance 722 and exit 724) of the autoclave 180 along the process direction 179. Sealing may comprise taping the gap closed, or closing the gap with a solid clamped plate (not shown) that acts as an intermediary between the inner surface 186 and the layup mandrel 120. In some embodiments, sealing may comprise sealing gap seals 124 that seal the gap 310 between the layup mandrel 120 and the autoclave 180 after the layup mandrel 120 is slid into the autoclave 180. In one embodiment, a perimeter 121 of the layup mandrel 120 is sealed to the inner surface 186 of the autoclave 180 (optional step 209). In embodiments with multiple layup mandrels 120 placed into the autoclave 180 (e.g., in series), each layup mandrel 120 may seal a separate entrance (e.g. entrance 722 or exit 724) (or portion thereof) of the autoclave 180. When the layup mandrels 120 are arranged in series, each may be sealed separately, or the layup mandrels 120 may utilize tandem sealing/joining techniques (e.g., where one layup mandrel 120 forms an upstream seal with the autoclave 180, and another layup mandrel 120 forms a downstream seal with the autoclave 180). After the sealing has been completed, the layup mandrel 120 defines a lower boundary of the autoclave 180 (i.e., a lower boundary of a pressure chamber 187 at the autoclave 180). In one embodiment, sealing the layup mandrel 120 into the autoclave 180 comprises sealing an arcuate gap 310 between the preform 170 and the inner surface 186 of the autoclave 180.

Step 210 includes hardening the preform 170 into a composite part 714 via application of heat and pressure within the autoclave 180. For thermoset preforms, this comprises heating the preform 170 to a curing temperature and applying pressure to consolidate that preform 170 into a desired shape. For thermoplastic preforms, this may comprise increasing a temperature of the preform 170 to a melting temperature of thermoplastic within the preform 170, consolidating the preform 170 under pressure, and cooling the preform 170 until it hardens/consolidates into a composite part 714. Hardening the preform 170 may comprise activating the heaters 122 in the layup mandrel 120 that are disposed under the preform 170 (e.g., beneath the layup surface 123), and/or activating the heaters 182 in the autoclave 180 that are disposed outside of the inner surface 186. The heaters 182 and/or 122 may comprise resistive heaters 126, susceptors 127 that respond to electromagnetic fields, etc. During hardening, one or more bladders 199 may support one or more hollow interiors 170-1 of the preform 170 against compaction caused by pressure applied by the autoclave 180 (optional step 211).

After the composite part 714 has been hardened, the autoclave 180 is unsealed, and the layup mandrel 120 may proceed in the process direction 179 out of the autoclave 180 via exit 724 in order to receive further work. Step 212 includes removing the caul plate 160, performing any desired post-hardening trimming or machining, and demolding the composite part 714. The composite part 714 then receives additional work (e.g., installation of frames at the composite part, installation of windows at the composite part) and the layup mandrel 120 is cleaned.

Figure 3:
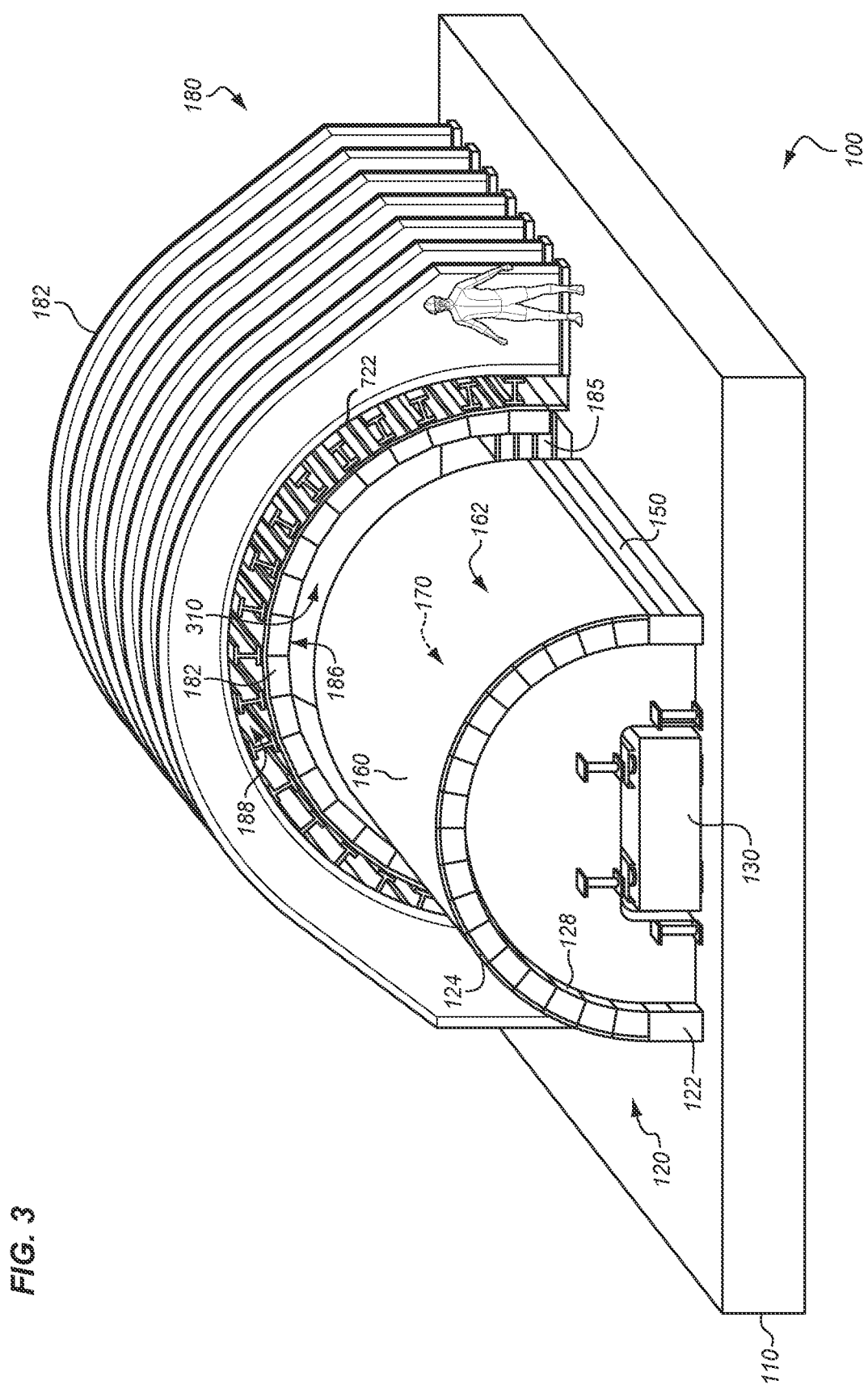
FIG. 3 is a perspective view of a preform being inserted into an autoclave in an illustrative embodiment.

FIG. 3 is a perspective view of a preform 170 being inserted into an autoclave 180 (e.g., under an insulated shroud 188 of the autoclave 180) in an illustrative embodiment. FIG. 3 illustrates how the layup mandrel 120 forms a boundary of the autoclave 180 in the process direction 179, and further illustrates perimeter seals 150 interlocking with the autoclave 180. Gap seals 124 lock with an insulated shroud 188 of the autoclave 180 to seal ends of the layup mandrel 120 into place. That is, gap seals 124 close the pressure chamber 187 by bridging gaps between the layup mandrel 120 and the autoclave 180 (e.g. at entrance 722 and exit 724, not show in FIG. 3).

Furthermore, FIG. 3 illustrates that the arcuate gap 310 between the layup mandrel 120 and the inner surface 186 of autoclave 180 remains narrow (i.e., less than ten inches) along the entirety of the contour 162 of the preform 170. That is, a volume between the layup mandrel 120 and the autoclave 180 is designed to be kept to a minimum to eliminate the amount of dead air space that must be heated and/or pressurized during operation. This reduction in stored energy dramatically reduce safety management approaches and system complexity when compared to a traditional autoclave. This reduced volume provides an opportunity for zonal or local control of heating and pressurization if desired.

Figure 4:
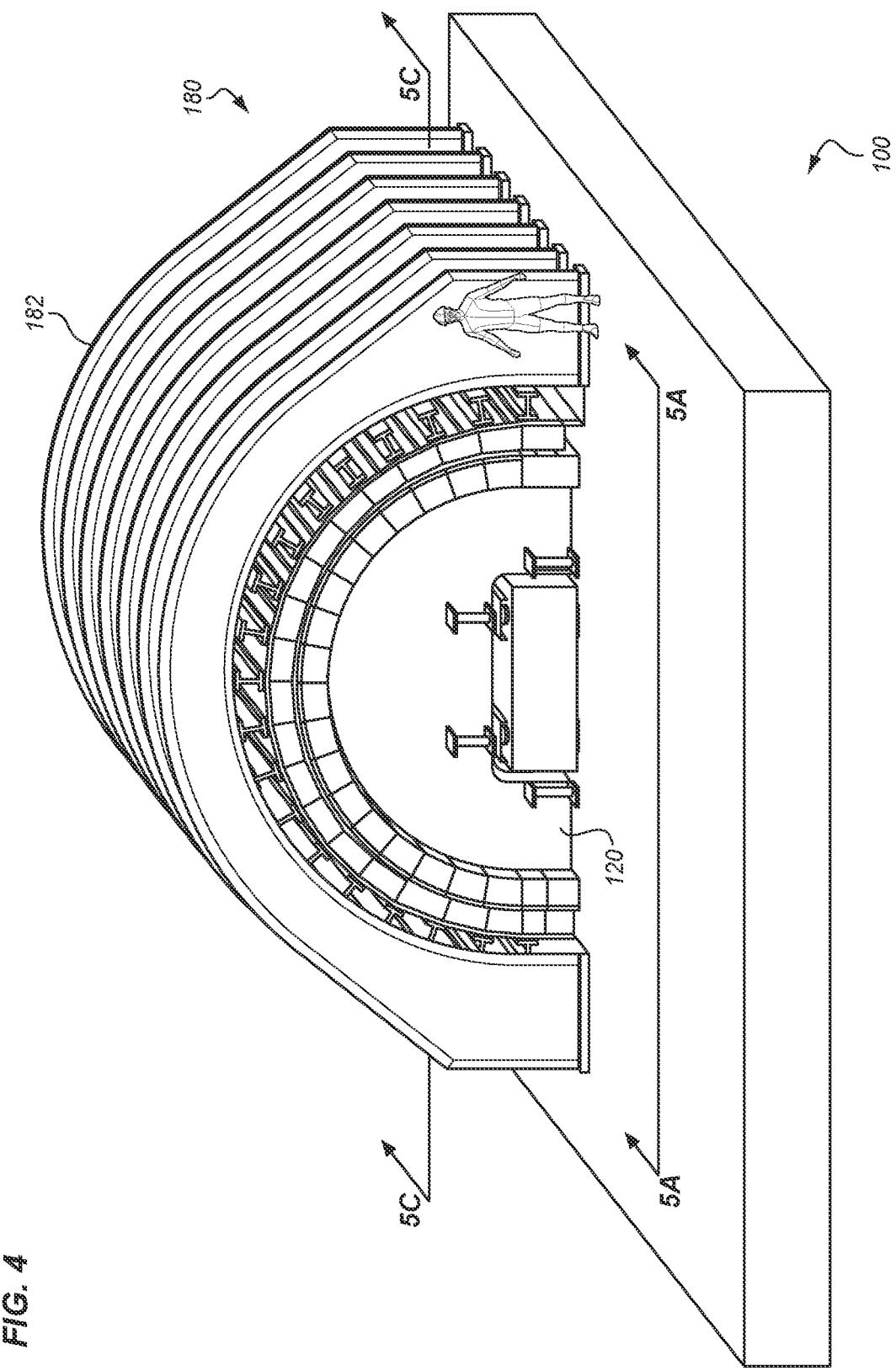
FIG. 4 is a perspective view of an autoclave into which a layup mandrel has been inserted in an illustrative embodiment.

FIG. 4 is a perspective view of an autoclave 180 into which a layup mandrel 120 has been inserted in an illustrative embodiment. In this embodiment, a single layup mandrel 120 has been placed into the autoclave 180. However, in further embodiments, multiple ones of the layup mandrels 120 may be placed into the autoclave 180 for curing at once.

FIGS. 5A-5C are views of the autoclave of FIG. 4 in an illustrative embodiment. FIG. 5A, which corresponds with view arrows 5A of FIG. 4, shows a layup mandrel 120 prior to layup while awaiting entry into an autoclave 180. The layup surface 123 of the layup mandrel 120 defines a contour 162, and layup mandrel 120 includes heaters 122 beneath layup surface 123. In FIG. 5B, layup has completed, and the layup mandrel 120 is covered by a preform 170 and a caul plate 160.

FIG. 5C is an end view of the autoclave 180 of FIG. 4 in an illustrative embodiment, and corresponds with view arrows 5C of FIG. 4. FIG. 5C makes clear that gap 310 between heaters 122 and heaters 182 is sealed by a cover 500 disposed between the layup mandrel 120 and the autoclave 180. The cover 500 is annular in shape, and may comprise a rigid tool or a flexible component that thermally insulates the autoclave 180 and is sealed to the autoclave 180. In this embodiment, the autoclave 180 forms an upper boundary 512 of a pressure chamber 510, while the layup mandrel 120 (or a caul or preform molded thereto) forms a lower boundary 514 of the pressure chamber 510. Seals may be applied in region 5E in order to form a pressure chamber 187.

FIG. 5D is a view of a further layup mandrel 560 and autoclave 550 for a wing panel in an illustrative embodiment. In this embodiment, the layup mandrel 560 is inserted into an autoclave 550 that includes supports 552, lower wall 554, and upper wall 556. A preform 580 is laid-up onto a contour 562 of the layup mandrel 560, and a caul plate 570 covers the preform 580. Together, the upper wall 556, supports 552, and the caul plate 570 form a pressure chamber 590 for hardening the preform 580. Perimeter seals 592 form boundaries of the pressure chamber 590 into and out of the page. For components of different dimensions, the perimeter seals 592 follow the different dimensions of layup mandrels for those components.

FIG. 5E depicts a variety of sealing regimes for an autoclave 180 in an illustrative embodiment, and corresponds with region 5E of FIG. 5C. In a first arrangement 500-10 depicted on the left, seals 500-40 directly contact an autoclave wall 500-30, and directly contact a caul plate 500-50 that contacts a layup mandrel surface 500-20. In a second arrangement 500-12, the seals 500-40 directly contact caul plate 500-50, which itself directly contacts the autoclave wall 500-30. The seals 500-40 also directly contact the layup mandrel surface 500-20. In a third arrangement 500-14, the seals 500-40 independently bridge the autoclave wall 500-30 and the layup mandrel surface 500-20, and the caul plate 500-50 terminates prior to reaching the seals 500-40.

FIG. 6 is a side view of a layup mandrel 610 that includes extended regions for sealing to an autoclave in an illustrative embodiment. Layup mandrel 610 may be utilized to facilitate fabrication of a section of fuselage that has a smaller cross section or length than other sections of fuselage being fabricated via an autoclave. The layup mandrel 610 itself has a length L corresponding to a length of the autoclave, and includes extended regions 620 and 630 having heights H (and/or cross-sectional arcs) that correspond with entrances/exits of the autoclave. Thus, the extended regions 620 and 630 are capable of being sealed to the autoclave, because the layup mandrel 610 is dimensioned to match the autoclave, regardless of a size of the preform being hardened. Meanwhile, a layup region 640 is dimensioned to a contour for a preform that is smaller than other preforms used for the autoclave. Thus, the layup region 640 may exhibit a smaller diameter, height, or length than the autoclave, but this is compensated for by the dimensions of the layup mandrel 610.

FIG. 7 is a top view of an autoclave and preparation station in an illustrative embodiment. FIG. 7 illustrates that layup mandrels 710 that receive preforms 170, and receive caul plates 716 and/or vacuum bags 717 at preparation station 718. The layup mandrels 710 are arranged in series for insertion into an autoclave 720 having entrance 722 at a first location and exit 724 at a second location separated by a distance in a process direction 779. In one embodiment, the autoclave 720, entrance 722, and exit 724 are all arcuate. These processes may also be utilized, with modification to geometry as needed, to facilitate fabrication of wing panels, spars, ribs, or frames. The autoclave 720 forms a portion of an arcuate pressure chamber which is completed by inserting a layup mandrel 710 into the autoclave 720 and sealing the layup mandrel 710 into position.

After exiting the autoclave 720, layup mandrels 710 proceed to a debag station 730 that performs caul plate 716 removal and/or vacuum debagging 717, where a composite part 714 is demolded from the layup mandrels 710. The layup mandrels 710 and caul plates 716 are then cleaned and returned to a start of the fabrication line in order to receive a new preform 170 for a composite part 714. The composite part 714 continues in the process direction 779 for post-cure processing into an aircraft (e.g., receiving fasteners, window installations, etc.). This process ensures that the layup mandrels 710 and caul plates 716 are capable of being rapidly and efficiently re-used, without the formation of waste products and without requiring an expansive amount of space at the factory floor 110.

Figure 8:
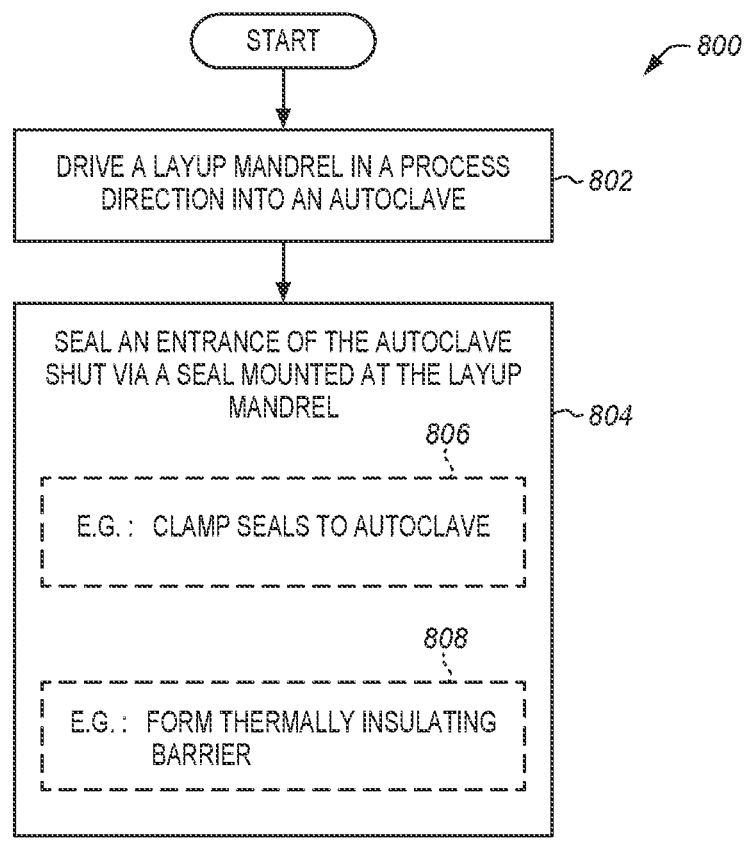
FIGS. 8-12 are flowcharts illustrating further techniques of operating layup mandrels and complementary autoclaves in illustrative embodiments.

FIGS. 8-12 are flowcharts illustrating further techniques of operating layup mandrels and complementary autoclaves in illustrative embodiments. These methods will be described according to the autoclave 180 in FIG. 1. FIG. 8 illustrates a method 800 of sealing an autoclave 180 in an illustrative embodiment. The method includes driving or inserting a layup mandrel 120 in a process direction 179 into an autoclave 180 in step 802, and sealing an entrance 722 (and optionally an exit 724) of the autoclave 180 shut via gap seals 124 mounted at the layup mandrel 120 in step 804. Sealing the entrance 722 shut may comprise clamping the gap seals 124 to the autoclave 180 (optional step 806). Thus, according to the processes described above, a layup mandrel 120 is brought within a desired distance (e.g. gap 310) of an autoclave 180 (e.g., an insulated shroud 188 of the autoclave 180), bladders 199 at the layup mandrel 120 are enabled to receive pressure from the autoclave 180, and the perimeter 121 of the layup mandrel 120 is sealed to the autoclave 180 to form a pressure chamber 187, which is then pressurized.

In another embodiment, the method further includes heating a preform 170 at the layup mandrel 120 via heaters 182 at the autoclave 180 and/or heating a preform 170 at the layup mandrel 120 via heaters 122 at the layup mandrel 120. In a further embodiment, the method further includes securing a preform 170 to the layup mandrel 120 by sealing edges of a caul plate 160 to the layup mandrel 120. In yet another embodiment, driving the layup mandrel 120 into the autoclave 180 forms a pressure chamber 187 between the layup mandrel 120 and the autoclave 180. This involves bringing three separate elements (e.g., perimeter seals 150, caul plate 160, autoclave 180) together to form a pressure chamber 187, and then removing several of the components when hardening is completed. In a still further embodiment, the method also includes driving the layup mandrel 120 in the process direction 179 out of the autoclave 180 via exit 724. In yet another embodiment, sealing the entrance 722 comprises sealing an arcuate gap 310 between the layup mandrel 120 and the autoclave 180, thereby forming a thermally insulating barrier (optional step 808). The concepts discussed herein may be utilized for any suitable composite parts, such as wing panels, ribs, spars, and/or frames for an airframe of an aircraft. In such embodiments, the insulated shroud 188 of the autoclave 180 is dimensioned (i.e., sized and shaped) to be complementary to the contour (e.g., contour 562 of FIG. 5D) of the layup mandrel 120 upon which a preform 170 has been placed. This complementary aspect enables the layup mandrel 120 itself to form a border of the autoclave 180, and enables a perimeter seal 150 to be used to seal the autoclave 180 and the layup mandrel 120 together.

Figure 9:
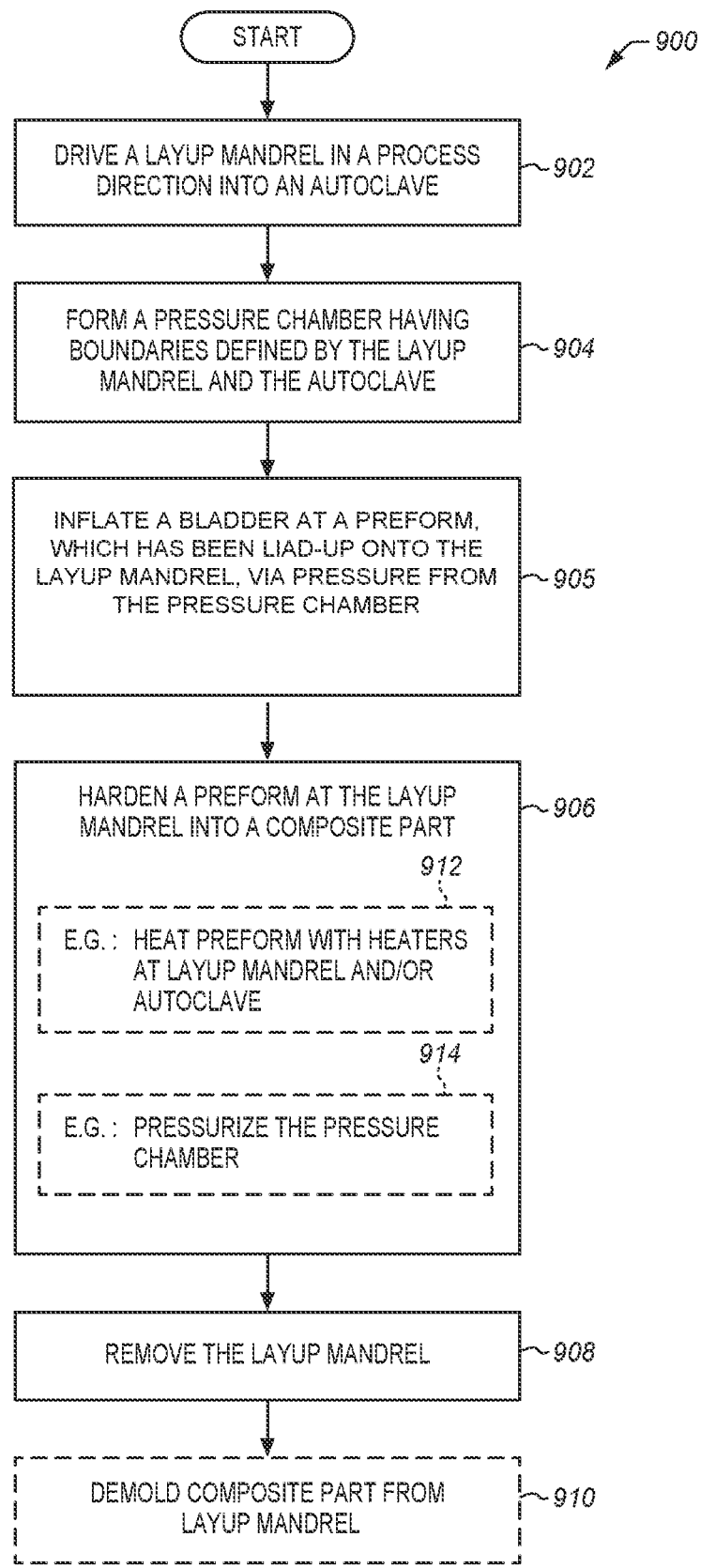

FIG. 9 depicts a method 900 of forming a pressure chamber 187 at an autoclave 180 in an illustrative embodiment. The method includes driving a layup mandrel 120 in a process direction 179 into an autoclave 180 in step 902, forming a pressure chamber 187 having boundaries defined by the layup mandrel 120 and the autoclave 180 in step 904, and inflating one or more bladders 199 at a preform 170, which has been laid-up onto the layup mandrel 120, via pressure from the pressure chamber 187 in step 905. The bladders 199 support a hollow interior 170-1 of the preform 170 against compaction. Method 900 further includes hardening the preform 170 at the layup mandrel 120 into a composite part 714 in step 906. Hardening the preform 170 may comprise heating the preform 170 with heaters 122 at the layup mandrel 120 and/or heaters 182 at the autoclave 180 (optional step 912). In a further embodiment, hardening the preform 170 may comprise using heated gas from a pressure system 190 at the autoclave 180 to pressurize the pressure chamber 187 (optional step 914). Method 900 further includes removing the layup mandrel 120 in step 908.

In a further embodiment, driving the layup mandrel 120 is performed via an Autonomous Guided Vehicle (AGV) 130, via a cart, via wheels, etc. In a further embodiment, the method 900 also includes demolding the composite part 714 from the layup mandrel 120 (optional step 910).

In a further embodiment, the autoclave 180 forms a first boundary of the pressure chamber 187, the layup mandrel 120 forms a second boundary of the pressure chamber 187, and the perimeter seals 150 form a third boundary. In a further embodiment, the pressure chamber 187 is arcuate, and forming a pressure chamber 187 comprises sealing an arcuate gap 310 (as well as longitudinal edges) between the layup mandrel 120 and the autoclave 180 (see step 804 of FIG. 8). In yet another embodiment, sealing the arcuate gap 310 comprises forming a thermally insulating (and pressure retaining) barrier (see step 808 of FIG. 8).

Figure 10:
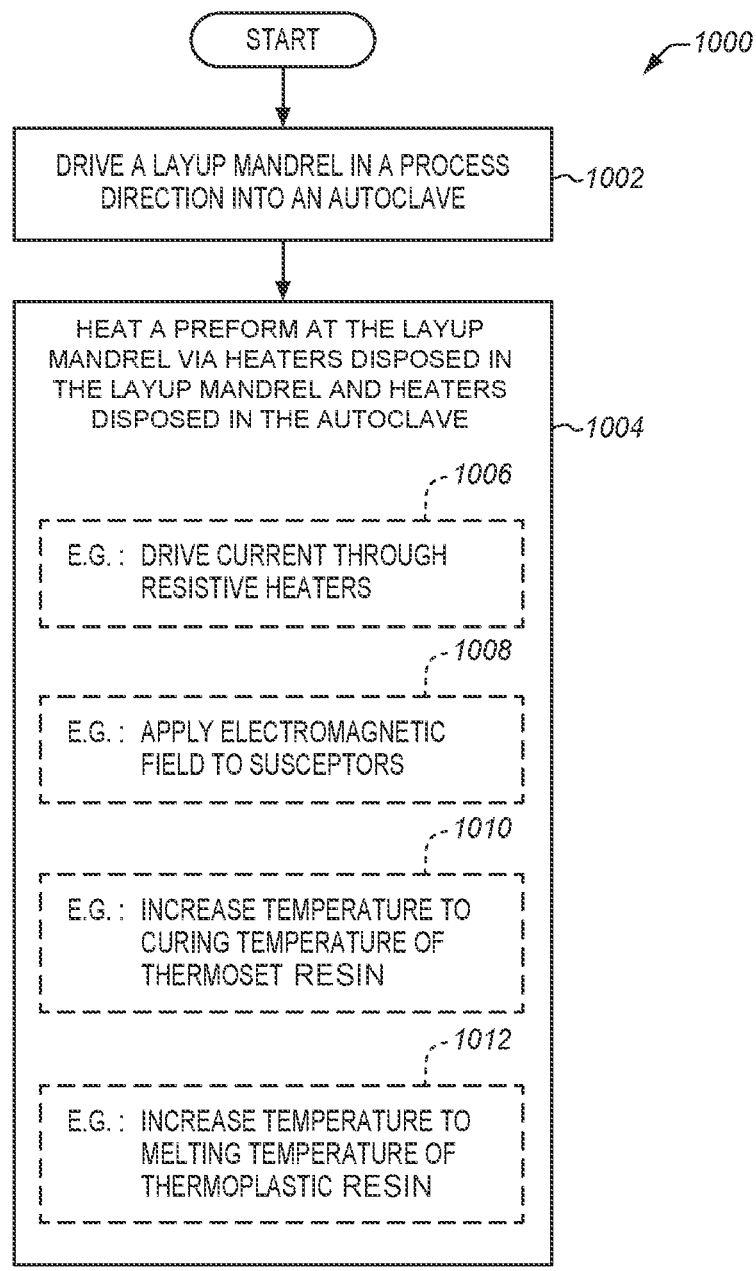

FIG. 10 illustrates a method 1000 of sealing an autoclave 180 in an illustrative embodiment. The method includes driving (e.g., via an Autonomous Guided Vehicle (AGV), on rails, manually, etc.) a layup mandrel 120 in a process direction 179 into an autoclave 180 in step 1002, and heating a preform 170 at the layup mandrel 120 via heaters 122 disposed in the layup mandrel 120 and via heaters 182 disposed in the autoclave 180 in step 1004. Heating the preform 170 may comprise driving current through resistive heaters 126 (see FIG. 1) at the layup mandrel 120 and the autoclave 180 (optional step 1006), or applying an electromagnetic field to susceptors 127 (see FIG. 1) at the layup mandrel 120 and the autoclave 180 (optional step 1008). In a still further embodiment, the preform 170 is heated via pressurized and heated gas pumped into the pressure chamber 187 of the autoclave 180. In a still further embodiment, heating the preform 170 comprises increasing a temperature of the preform 170 to a curing temperature of a thermoset resin within the preform 170 (optional step 1010), or heating the preform 170 comprises increasing a temperature of the preform 170 to a melting temperature of a thermoplastic resin within the preform 170 (optional step 1012), after which the preform 170 is cooled below the melting temperature.

In further embodiments, the method 1000 further comprises securing a preform 170 to the layup mandrel 120 by sealing edges of a caul plate 160 to the layup mandrel 120. After the preform 170 has been hardened, the method 1000 may further comprise driving the layup mandrel 120 in the process direction 179 out of the autoclave 180. Furthermore, prior to heating, the method 1000 may comprise sealing a gap 310 between the layup mandrel 120 and the autoclave 180 with a thermally insulating barrier (e.g., a seal). The layup mandrel 120 is dimensioned for extraction from the autoclave 180 via travel in the same process direction 179 that the layup mandrel 120 was inserted into the autoclave 180. Furthermore, the layup mandrel 120 forms a lower boundary of a pressure chamber 187 of the autoclave 180 while inserted into the autoclave 180.

Figure 11:
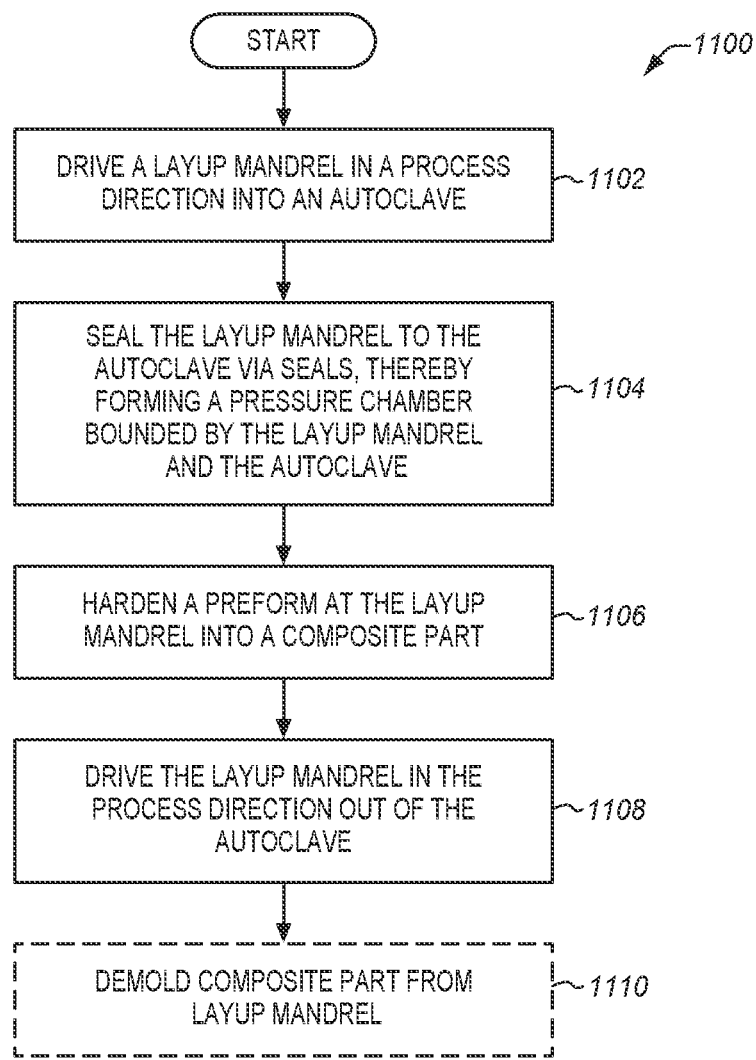

FIG. 11 depicts a method 1100 of sealing an autoclave 180 in an illustrative embodiment. The method 1100 includes driving (e.g., via Autonomous Guided Vehicle (AGV) 130, via rails, via manual carts, etc.) a layup mandrel 120 in a process direction 179 into an autoclave 180 in step 1102, and sealing the layup mandrel 120 to the autoclave 180 via gap seals 124/perimeter seals 150, thereby forming a pressure chamber 187 bounded by the layup mandrel 120 and the autoclave 180 in step 1104. Method 1100 further includes hardening a preform 170 at the layup mandrel 120 into a composite part 714 in step 1106, and driving the layup mandrel 120 in the process direction 179 out of the autoclave 180 in step 1108. The autoclave 180 operates as a portal between a pre-cure/clean room environment 177 and a post-hardening environment (e.g., assembly region/environment 178).

In a further embodiment, driving the layup mandrel 120 is performed via an Autonomous Guided Vehicle (AGV) 130. Method 1100 may further include demolding the composite part 714 from the layup mandrel 120 (optional step 1110). In one embodiment, hardening the preform 170 comprises heating the preform 170 with heaters 122 at the layup mandrel 120 and/or heaters 182 at the autoclave 180 (see step 912 of FIG. 9). In one embodiment, driving the layup mandrel 120 into the autoclave 180 forms the pressure chamber 187 between the layup mandrel 120 and the autoclave 180 (i.e., after perimeter seals 150 and/or other seals are in place). In a further embodiment, driving the layup mandrel 120 in the process direction 179 out of the autoclave 180 transitions the layup mandrel 120 out of a clean room environment 177. That is, the layup mandrel 120 is kept in a clean room environment 177 during layup and preparation, and then is moved into an autoclave 180 which forms a boundary between a clean room environment 177 and a non-clean room environment (e.g., assembly region/environment 178). After hardening is completed, the layup mandrel 120 advances out of the autoclave 180 into the non-clean room environment, where demolding and trimming occurs. The layup mandrel 120 is then cleaned and returned to the clean room environment 177 to receive a preform 170 for another composite part 714.

In one embodiment, sealing the layup mandrel 120 to the autoclave 180 comprises sealing an arcuate gap 310 between the layup mandrel 120 and the autoclave 180 (see step 804 of FIG. 8). Sealing the arcuate gap 310 may comprise forming a thermally insulating barrier between the autoclave 180 and the layup mandrel 120 (see step 808 of FIG. 8).

Figure 12:
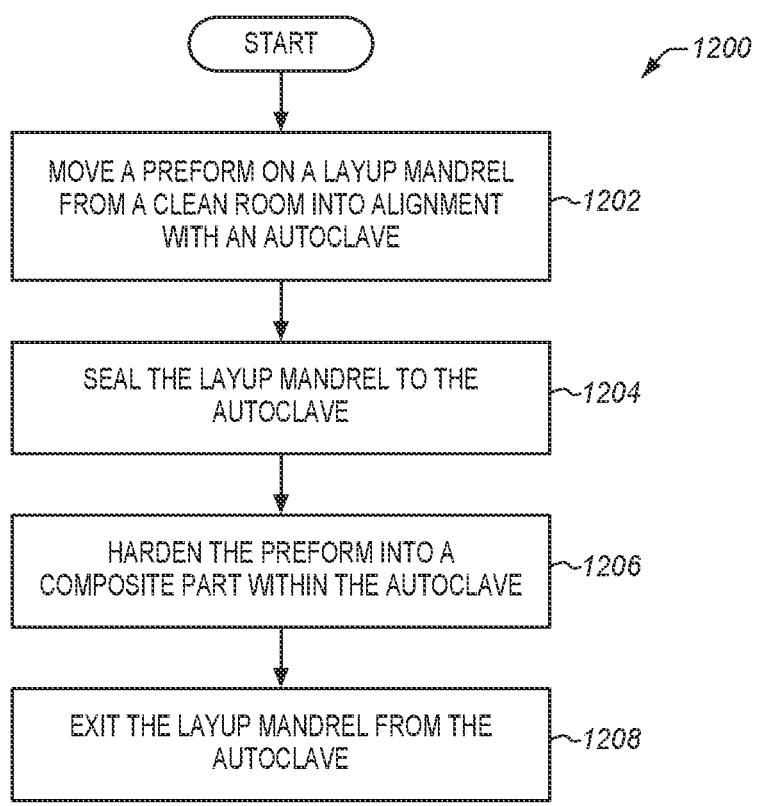

FIG. 12 depicts a method 1200 of sealing an autoclave 180 in an illustrative embodiment. Method 1200 includes moving a preform 170 on a layup mandrel 120 from a clean room environment 177 into alignment with an autoclave 180 in step 1202. In one embodiment, a caul plate 160 is placed over the preform 170, and conforms to the layup mandrel 120. Step 1204 includes sealing the layup mandrel 120 to the autoclave 180. In one embodiment, this results in a pressure chamber 187 between the caul plate 160 and the autoclave 180. The pressure chamber 187 is bounded by the autoclave 180 on one side and the caul plate 160 on another side. Method 1200 further includes hardening the preform 170 into a composite part 714 within the autoclave 180 in step 1206, and exiting the layup mandrel 120 from the autoclave 180 in step 1208. As the layup mandrel 120 exits from the autoclave 180, it has fully left the clean room environment 177 and enters an assembly region/environment 178 where demolding and trimming of the resulting composite part 714 is performed.

Figure 13:
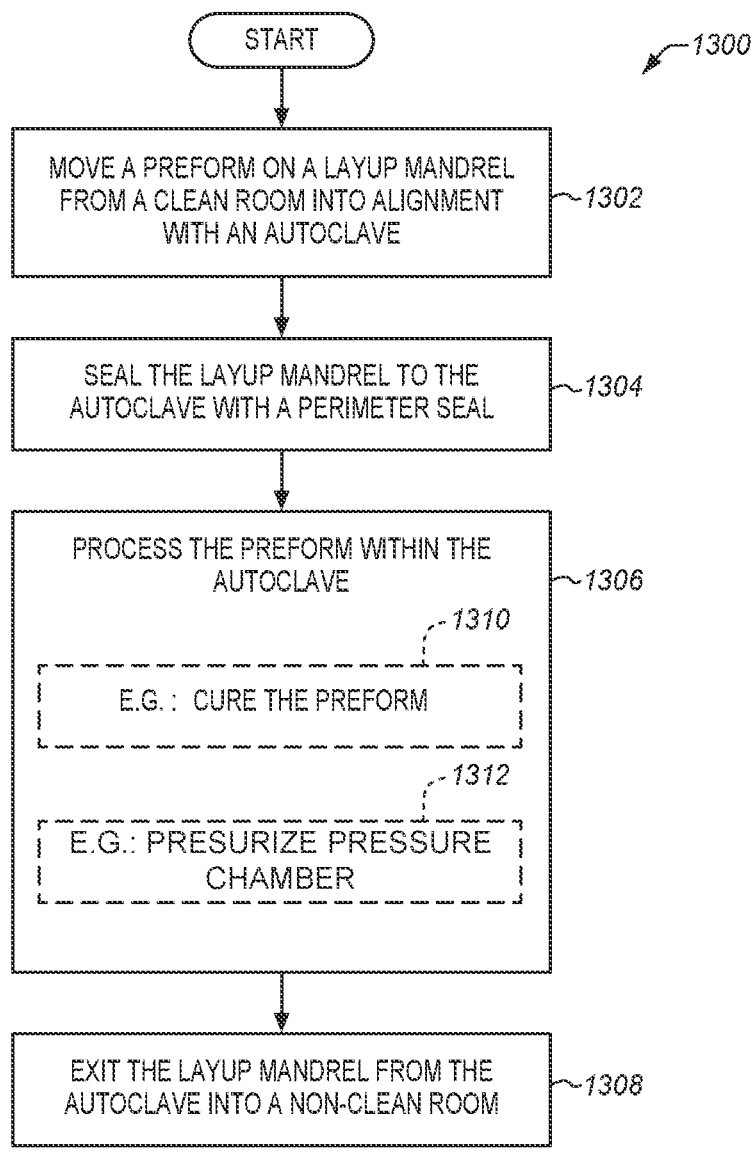
FIG. 13 depicts a method 1300 of moving a preform out of a clean room in an illustrative embodiment.

FIG. 13 depicts a method 1300 of moving a preform 170 out of a clean room environment 177 in an illustrative embodiment. The method includes moving a preform 170 on a layup mandrel 120 from a clean room environment 177 into alignment with an autoclave 180 in step 1302, and sealing the layup mandrel 120 to the autoclave 180 with a perimeter seal 150 in step 1304. Sealing of the layup mandrel 120 to the autoclave 180 results in a pressure chamber 187 around the preform 170. Method 1300 further includes processing the preform 170 within the autoclave 180 in step 1306. Processing the preform 170 may include curing the preform 170 (optional step 1310), pressuring the pressure chamber 187 formed by the layup mandrel 120 and the autoclave 180 (optional step 1312), or other processing actions. Method 1300 further includes exiting the layup mandrel 120 from the autoclave 180 into a non-clean room (e.g., assembly region/environment 178) in step 1308.

In the following examples, additional processes, systems, and methods are described in the context of an autoclave in a continuous line assembly environment.

Figure 14:
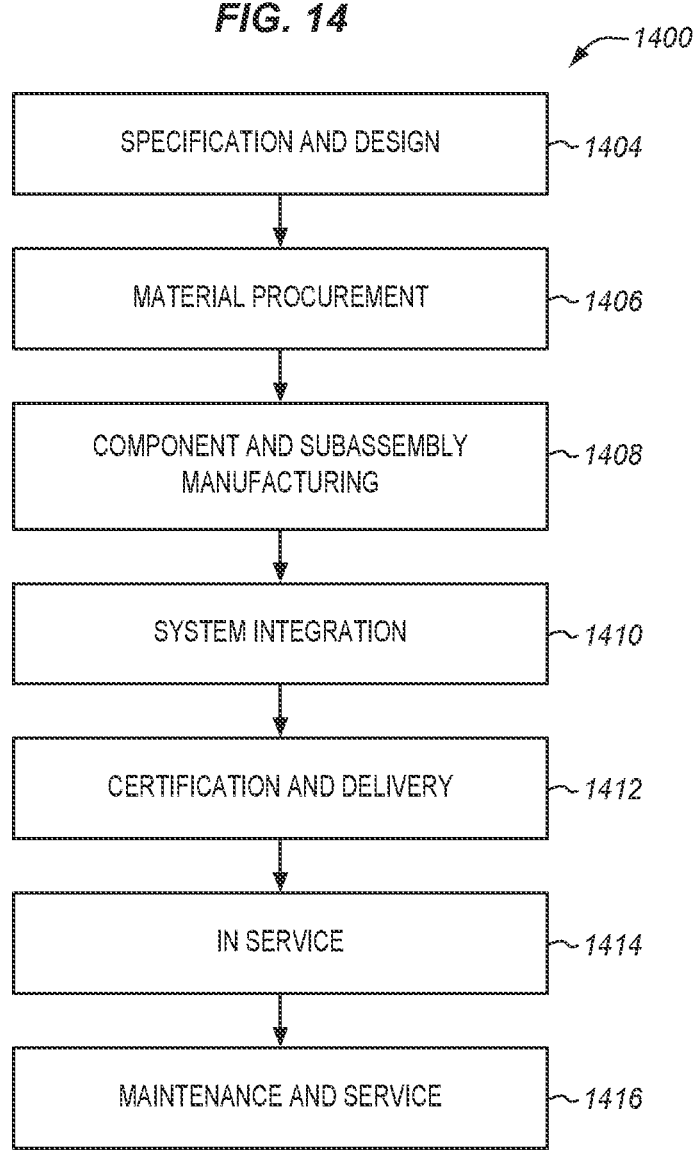
FIG. 14 is a flow diagram of aircraft production and service methodology in an illustrative embodiment.
Figure 15:
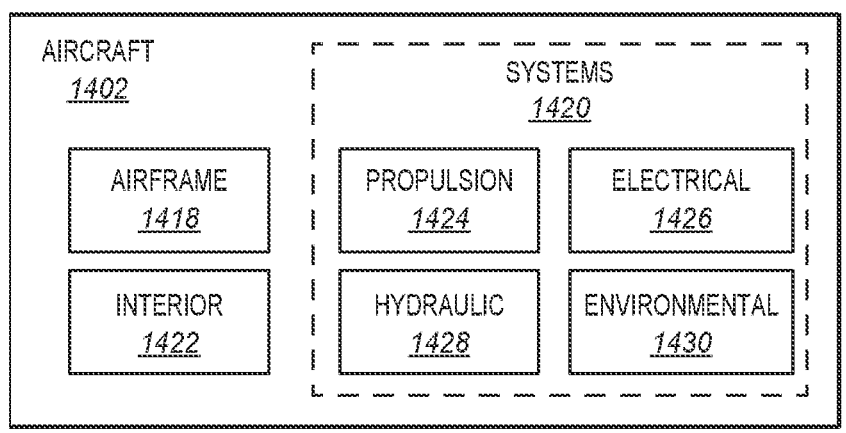
FIG. 15 is a block diagram of an aircraft in an illustrative embodiment.

Referring more particularly to the drawings, embodiments of the disclosure may be described in the context of aircraft manufacturing and service in method 1400 as shown in FIG. 14 and an aircraft 1402 as shown in FIG. 15. FIG. 14 is a flow diagram of aircraft production and service methodology in an illustrative embodiment. During pre-production, method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine work in maintenance and service 1416 (which may also include modification, reconfiguration, refurbishment, and so on). Apparatus and methods embodied herein may be employed during any one or more suitable stages of the production and service described in method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion system 1424, electrical system 1426, hydraulic system 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

FIG. 15 is a block diagram of an aircraft in an illustrative embodiment. As shown in FIG. 15, the aircraft 1402 produced by method 1400 may include an airframe 1418 with a plurality of systems 1420 and an interior 1422. Examples of systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1400. For example, components or subassemblies corresponding to component and subassembly manufacturing 1408 may be fabricated or manufactured in a manner similar to components or subassemblies produced while the aircraft 1402 is in service. Also, one or more apparatus embodiments, method embodiments, or a combination thereof may be utilized during the component and subassembly manufacturing 1408 and system integration 1410, for example, by substantially expediting assembly of, or reducing the cost of, an aircraft 1402. Similarly, one or more of apparatus embodiments, method embodiments, or a combination thereof may be utilized while the aircraft 1402 is in service, for example and without limitation, during the maintenance and service 1416. For example, the techniques and systems described herein may be used for material procurement 1406, component and subassembly manufacturing 1408, system integration 1410, service 1414, and/or maintenance and service 1416, and/or may be used for airframe 1418 and/or interior 1422. These techniques and systems may even be utilized for systems 1420, including, for example, propulsion system 1424, electrical system 1426, hydraulic 1428, and/or environmental system 1430.

In one embodiment, a part comprises a portion of airframe 1418, and is manufactured during component and subassembly manufacturing 1408. The part may then be assembled into an aircraft in system integration 1410, and then be utilized in service 1414 until wear renders the part unusable. Then, in maintenance and service 1416, the part may be discarded and replaced with a newly manufactured part. Inventive components and methods may be utilized throughout component and subassembly manufacturing 1408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for hardening a preform into a composite part, the method comprising:
   aligning a layup mandrel carrying a preform for insertion into an autoclave having an inner surface that is complementary to a contour of the preform;
   sealing the layup mandrel into the autoclave; and
   hardening the preform into a composite part via application of heat within the autoclave,
   wherein hardening the preform comprises applying heat via heaters in the layup mandrel that are disposed under the preform.

2. The method of claim 1 further comprising:
   driving the layup mandrel in a process direction into the autoclave, thereby nesting the preform to the inner surface of the autoclave.

3. The method of claim 2 wherein:
   driving the layup mandrel into the autoclave results in a gap between the inner surface of the autoclave and the contour of the preform of less than ten inches.

4. The method of claim 1 wherein:
   hardening the preform comprises applying heat via heaters in the autoclave that are disposed outside of the inner surface.

5. The method of claim 1 wherein:
   the autoclave forms a boundary between a clean room environment and an assembly environment.

6. The method of claim 1 further comprising:
   sealing a caul plate to the layup mandrel prior to sealing the layup mandrel into the autoclave.

7. The method of claim 1 wherein:
   sealing the layup mandrel into the autoclave comprises sealing an arcuate gap between the preform and the inner surface of the autoclave.

8. A method for hardening a preform into a composite part, the method comprising:
   aligning a layup mandrel carrying a preform for insertion into an autoclave having an inner surface that is complementary to a contour of the preform;
   sealing the layup mandrel into the autoclave; and
   sealing a vacuum bag to the layup mandrel prior to sealing the layup mandrel into the autoclave.

9. A method for hardening a preform into a composite part, the method comprising:
   aligning a layup mandrel carrying a preform for insertion into an autoclave having an inner surface that is complementary to a contour of the preform; and
   sealing the layup mandrel into the autoclave,
   wherein:
      sealing the layup mandrel into the autoclave comprises sealing an arcuate gap between the preform and the inner surface of the autoclave; and
      sealing the layup mandrel into the autoclave comprises sealing a perimeter of the layup mandrel to the inner surface of the autoclave.

10. A method for hardening a preform into a composite part, the method comprising:
    aligning a layup mandrel carrying a preform for insertion into an autoclave having an inner surface that is complementary to a contour of the preform; and
    sealing the layup mandrel into the autoclave,
    the layup mandrel forms a lower boundary of a pressure chamber of the autoclave.

11. A method for hardening a preform into a composite part, the method comprising:
    aligning a layup mandrel carrying a preform for insertion into an autoclave having an inner surface that is complementary to a contour of the preform;
    sealing the layup mandrel into the autoclave; and
    disposing a bladder at the preform that structurally supports a hollow interior of the preform.

12. A method for hardening a preform into a composite part, the method comprising:
    aligning a layup mandrel carrying a preform for insertion into an autoclave having an inner surface that is complementary to a contour of the preform;
    sealing the layup mandrel into the autoclave; and
    supporting a hollow interior of the preform against compaction caused by pressure applied by the autoclave.

13. A method of moving a preform out of a clean room environment, the method comprising:
    moving a preform on a layup mandrel from a clean room environment;
    sealing the layup mandrel to an autoclave;
    processing the preform within the autoclave; and
    exiting the layup mandrel from the autoclave, thereby entering an assembly environment separate from the clean room environment,
    wherein sealing the layup mandrel to the autoclave comprises sealing a perimeter of the layup mandrel to an inner surface of the autoclave.

14. The method of claim 13 wherein:
    moving the preform on the layup mandrel comprises moving the layup mandrel from the clean room environment into alignment with the autoclave.

15. The method of claim 13 wherein:
    sealing the layup mandrel to the autoclave comprises sealing a contoured gap between the layup mandrel and the autoclave.

16. The method of claim 13 wherein:
    sealing the layup mandrel to the autoclave forms a pressure chamber in which the preform is hardened.

17. A method for hardening a preform into a composite part, the method comprising:

aligning a layup mandrel carrying a preform for insertion into an autoclave having an inner surface that is complementary to a contour of the preform;

disposing a bladder at the preform that structurally supports a hollow interior of the preform against compaction caused by pressure applied by the autoclave;

driving the layup mandrel in a process direction into the autoclave, thereby nesting the preform to the inner surface of the autoclave, resulting in a gap between the inner surface of the autoclave and the contour of the preform of less than ten inches;

sealing a caul plate to the layup mandrel;

sealing a vacuum bag to the layup mandrel;

sealing the layup mandrel into the autoclave by sealing the gap between the preform and the inner surface of the autoclave and sealing a perimeter of the layup mandrel to the inner surface of the autoclave, wherein the layup mandrel forms a lower boundary of a pressure chamber of the autoclave, and wherein the autoclave forms a boundary between a clean room environment and an assembly environment; and hardening the preform into a composite part via application of heat within the autoclave by applying heat via heaters in the layup mandrel that are disposed under the preform and via heaters in the autoclave that are disposed outside of the inner surface.

18. The method of claim 17 wherein:
the autoclave forms a boundary between the clean room environment and the assembly environment.

19. A method of moving a preform out of a clean room environment, the method comprising:

moving a preform on a layup mandrel from a clean room environment by moving the layup mandrel into alignment with an autoclave;

sealing the layup mandrel to the autoclave comprising sealing a contoured gap between the layup mandrel and the autoclave, wherein sealing the layup mandrel to the autoclave forms a pressure chamber in which the preform is hardened;

processing the preform within the autoclave; and exiting the layup mandrel from the autoclave, thereby entering an assembly environment separate from the clean room environment, wherein the layup mandrel forms a lower boundary of a pressure chamber of the autoclave.

20. The method of claim 19 wherein:
the autoclave forms a boundary between the clean room environment and the assembly environment.

* * * * *